US012745794B2

(12) United States Patent
Dittmann et al.

(10) Patent No.: US 12,745,794 B2
(45) Date of Patent: Sep. 29, 2026

(54) AEROSOL-GENERATING DEVICE AND SYSTEM

(71) Applicant: Philip Morris Products S.A., Neuchatel (CH)

(72) Inventors: Leander Dittmann, Pully (CH); Robert Emmett, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 582 days.

(21) Appl. No.: 17/905,740

(22) PCT Filed: Mar. 10, 2021

(86) PCT No.: PCT/EP2021/056015
§ 371 (c)(1),
(2) Date: Sep. 6, 2022

(87) PCT Pub. No.: WO2021/180772
PCT Pub. Date: Sep. 16, 2021

(65) Prior Publication Data
US 2023/0112889 A1 Apr. 13, 2023

(30) Foreign Application Priority Data
Mar. 11, 2020 (EP) ..................................... 20162477

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/50* (2020.01); *B05B 17/0646* (2013.01)

(58) Field of Classification Search
CPC ...... A24F 40/50; A24F 40/05; B05B 17/0646; B05B 17/0669
See application file for complete search history.

(56) References Cited

U.S. PATENT DOCUMENTS 4,605,167 A 8/1986 Maehara
2005/0224076 A1 10/2005 Pfichner et al.
(Continued)

FOREIGN PATENT DOCUMENTS

CN 108135274 A 6/2018
DE 10 2015 112 855 A1 2/2017
(Continued)

OTHER PUBLICATIONS

International Search Report and Written Opinion issued Jun. 4, 2021, in PCT/EP2021/056015 filed Mar. 10, 2021, 11 pages.
(Continued)

*Primary Examiner* — Michael H. Wilson
*Assistant Examiner* — Stephanie Lynn Moore
(74) *Attorney, Agent, or Firm* — Oblon, McClelland, Maier & Neustadt, L.L.P.

(57) ABSTRACT

An aerosol-generating device is provided, including: a membrane having an aerosol-generation zone, in which the aerosol-generation zone includes a plurality of nozzles, the plurality of nozzles being the only nozzles in the aerosol-generation zone; and an actuator coupled to the membrane, in which the actuator is configured to excite the membrane to induce a vibration of the membrane at one or more predetermined modal frequencies of the membrane such that a liquid aerosol-forming substrate passing through the plurality of nozzles is aerosolised, in which more than 50% of the plurality of nozzles are located closer to antinodes than to nodes of the membrane, where the antinodes and the nodes correspond to the membrane being excited at the one
(Continued)

or more predetermined modal frequencies of the membrane, and in which the membrane progressively changes in thickness from a centre of the membrane to a peripheral edge of the membrane.

15 Claims, 17 Drawing Sheets

(51) Int. Cl.

| | |
|---|---|
| ***A24F 40/50*** | (2020.01) |
| ***B05B 17/00*** | (2006.01) |

(56) References Cited

U.S. PATENT DOCUMENTS

| | | | |
|---|---|---|---|
| 2006/0198942 | A1 | 9/2006 | O'Connor et al. |
| 2006/0213503 | A1 | 9/2006 | Borgschulte et al. |
| 2013/0277446 | A1 | 10/2013 | Selby et al. |
| 2018/0027877 | A1 | 2/2018 | Tucker et al. |
| 2018/0369853 | A1 | 12/2018 | Pooley |

FOREIGN PATENT DOCUMENTS

| | | | |
|---|---|---|---|
| EP | 0 084 458 | A2 | 7/1983 |
| JP | S59354 | A | 1/1984 |
| JP | 2011156481 | A | 8/2011 |
| RU | 2 651 538 | C1 | 4/2018 |
| RU | 2 711 315 | C1 | 1/2020 |
| WO | WO 2009102976 | A2 | 8/2009 |
| WO | WO 2010/069932 | A1 | 6/2010 |
| WO | WO 2011141475 | A1 | 11/2011 |
| WO | WO 2017076590 | A1 | 5/2017 |
| WO | WO 2019/134883 | A1 | 7/2019 |

OTHER PUBLICATIONS

International Preliminary Report on Patentability issued Jun. 13, 2022, in PCT/EP2021/056015 filed Mar. 10, 2021, 14 pages.

Combined Russian Office Action and Search Report issued Jul. 4, 2024 in Russian Patent Application No. 2022124435/03 (with English Translation of Office Action only), 10 pages.

Extended European Search Report issued on Sep. 7, 2020 in European Patent Application No. 20162477.2, 8 pages.

Written Opinion of the International Preliminary Examining Authority issued on Jan. 25, 2022 in PCT/EP2021/056015 filed on Mar. 10, 2021, 9 pages.

Japanese Office Action issued Mar. 27, 2025 in corresponding Japanese Patent Application No. 2022-554196, with English Translation, 5 pages.

Office Action and Search Report dated Mar. 24, 2026 on the corresponding Chinese Patent Application No. 202180020305.7.

Office Action dated May 22, 2026 issued in corresponding Philippines Patent Application No. 1-2022-552343.

Notice of Allowance dated May 28, 2026 issued in corresponding Chinese Patent Application No. 202180020305.7.

AEROSOL-GENERATING DEVICE AND SYSTEM

The present disclosure relates to an aerosol-generating device and system for aerosolising a liquid aerosol-forming substrate through use of a vibratable perforated membrane.

Known vibrating nebulizers for aerosolising a liquid aerosol-forming substrate employ a membrane having a homogenous distribution of nozzles. By "homogenous" is meant that the nozzles are distributed evenly over the surface of the membrane, with all of the nozzles having the same profile and size. The membrane is coupled to an actuator, with the actuator functioning to induce vibration of the membrane. On contact of the membrane with a liquid aerosol-forming substrate, the vibrating action of the membrane results in the liquid aerosol-forming substrate being pushed through the nozzles to form aerosol droplets. However, such known vibrating nebulizers suffer from inconsistent aerosol quality over the area of the membrane.

There is a need for providing an improved means of aerosolising a liquid aerosol-forming substrate using a vibrating perforated membrane.

According to an aspect of the present invention, there is provided an aerosol-generating device comprising:

- a membrane having an aerosol-generation zone, in which the aerosol-generation zone comprises a plurality of nozzles, the plurality of nozzles being the only nozzles in the aerosol-generation zone; and
- an actuator coupled to the membrane;
- wherein the actuator is configured to excite the membrane to induce a vibration of the membrane at one or more predetermined modal frequencies of the membrane in order that, in use, a liquid aerosol-forming substrate passing through the plurality of nozzles is aerosolised;
- wherein the plurality of nozzles are preferentially located proximate to antinodes corresponding to the membrane being excited at the one or more predetermined modal frequencies of the membrane.

As used herein, the term "nozzle" refers to an aperture, hole or bore through the membrane that provides a passage for a liquid aerosol-forming substrate to move through the membrane.

As used herein, the term "antinodes" refers to those locations of the membrane where the magnitude of the displacement of the membrane is a maximum in between adjacent nodal lines when the membrane is vibrating at a modal frequency of the membrane.

As used herein, the term "nodes" refers to those locations of the membrane where the displacement of the membrane is always zero when the membrane is vibrating at a modal frequency of the membrane. When a given vibration mode of the membrane is excited at a corresponding modal frequency, the nodes will be defined along one or more lines, referred to as "nodal lines".

As used herein, the term "modal frequency" refers to any of the natural or resonant frequencies of the membrane. Each vibration mode of the membrane will have a different frequency and shape, referred to as modal frequency and modal shape respectively. The lowest (or first) modal frequency of the membrane is known as the fundamental frequency. The modal frequencies of a membrane will be affected by its physical properties and any boundary conditions applied to the membrane. For example, the Young's modulus, Poisson's ratio and the mass density of the membrane, as well as any constraints on the membrane may each individually influence the modal response of the membrane, in terms of both the modal frequencies and the modal shapes associated with a given mode.

As used herein, the term "predetermined modal frequency" refers to a modal frequency of the membrane which the actuator is specifically designed to excite.

Where this application refers to a first predetermined modal frequency and a second predetermined frequency, the terms "first" and "second" indicate that the respective frequencies relate to different vibration modes, and do not require that the first predetermined modal frequency be the fundamental frequency of the membrane and the second predetermined modal frequency be the second overtone or harmonic of the membrane.

As used herein, the term "preferentially located" refers to more than 50% of the plurality of nozzles being located proximate to antinodes corresponding to the membrane being excited at the one or more predetermined modal frequencies of the membrane.

As used herein, the term "proximate" refers to the nozzles being closer to antinodes than nodes, where the antinodes and nodes correspond to the membrane being excited at the one or more predetermined modal frequencies of the membrane.

Preferentially locating the plurality of nozzles proximate to antinodes corresponding to the membrane being excited at the one or more predetermined modal frequencies of the membrane assists in maximising the energy and velocity imparted to individual aerosol droplets from vibration of the membrane. Increasing the velocity imparted to individual aerosol droplets has the benefit of enhancing the distance which those droplets are ejected from the nozzles of the membrane. Preferentially locating the nozzles proximate to the antinodes also provides an aerosol droplet formation having increased uniformity over the aerosol-generation zone compared to an aerosol droplet formation resulting from a membrane having a homogenous distribution of nozzles.

Preferably, the plurality of nozzles are non-homogenously distributed over the aerosol-generation zone.

Different aerosol droplet formation regimes can be quantified by reference to various parameters, with the values of the parameters providing a measure of the quality of an aerosol-droplet formation. An example of one such parameter is the Weber number, We. For a membrane having an arrangement of nozzles in the aerosol-generation zone, where the nozzles are circular when viewing the membrane in plan, with all nozzles having the same diameter, the membrane vibrated at a given frequency f and a given liquid aerosol-forming substrate brought into contact with the vibrating membrane to cause the liquid aerosol-forming substrate to be aerosolised through the nozzles, the Weber number can be expressed as:

$$We = \frac{\rho v^2 D}{\sigma}$$

where:

- $\varrho$ is the mass density of the liquid aerosol-forming substrate;
- v is a velocity of a droplet of the liquid aerosol-forming substrate;
- D is the diameter of each nozzle;
- $\sigma$ is the surface tension of the liquid aerosol-forming substrate.

A lower Weber number, We, is associated with an aerosol droplet formation having poor quality. Explaining further, the lower the Weber number, the greater the likelihood of individual aerosol droplets breaking up into smaller droplets. In extreme cases, the energy imparted to the liquid aerosol-forming substrate by vibration of the membrane may be so low that some droplets, after passing through the nozzles in the membrane, fall back to settle on the surface of the membrane. The phenomenon of break-up of individual aerosol droplets into smaller droplets having the same collective volume but with less surface area is referred to as Rayleigh break-up or Rayleigh instability. Rayleigh break-up is highly undesirable and is indicative of a poor quality aerosol droplet formation. In contrast, higher values of Weber number are associated with an aerosol droplet formations having high quality and are indicative of increased energy and velocity having been imparted to the aerosol droplets. A high quality aerosol droplet formation would be indicated by a lack of Rayleigh break-up, as well as a lack of fall back and settling of aerosol droplets on the surface of the membrane. In summary, droplet size, droplet mass and droplet velocity are parameters which are relevant to quantifying the quality of an aerosol droplet formation.

Preferably, in use the aerosol-generating device generates an aerosol droplet formation comprising droplets with diameters in a range of 0.1 μm to 5 μm.

For the equation defining the Weber number, the velocity v can be expressed as a characteristic velocity of the membrane when excited at a frequency f. For a given location on the membrane, this characteristic velocity can be expressed as the displacement of the membrane at that location multiplied by the frequency f. Therefore, it can be seen that locating the nozzles at, or as close as possible to, the antinodes assists in maximising the amount of energy and velocity imparted to individual liquid aerosol-forming substrate droplets by the membrane. This helps to enhance the Weber number for the resulting aerosol droplet formation, with the droplets having a reduced likelihood of Rayleigh break-up. Locating the plurality of nozzles at, or as close as possible to the antinodes will also increase the distance which those droplets are able to be ejected from the membrane.

Preferably, the nozzles are circular in shape. The use of nozzles which are circular in shape is preferred because the circular shape maximizes the ratio of area to perimeter, therefore reducing viscous drag forces and boundary layer build-up. However, the use of nozzles which are elliptical in shape has also been found to result in acceptable performance in terms of the resulting aerosol droplet formation.

The membrane may be formed of a polymer material, thereby providing advantages of reduced mass and inertia. However, the membrane may be formed of any other material, such as a metallic material. The membrane may be a composite of two or more different materials. Factors affecting the choice of material for the membrane may include the particular liquid aerosol-forming substrate(s) intended to be used with and aerosolised by the aerosol-generating device. For example, it is highly desirable to choose a material for the membrane which does not chemically react with or degrade as a consequence of contact with the particular liquid aerosol-forming substrate. By way of example only, the membrane may be formed of any of palladium, stainless steel, copper-nickel alloy, polyimide, polyamide, silicon or aluminium nitride.

Different membrane profiles have correspondingly different modal frequencies and modal shapes. Advantageously, the membrane is circular in profile. A circular-profiled membrane has been found beneficial when the aerosol-generating device is used in a smoking system in the form of an elongated cylindrical smoking article. Further, the use of a circular-profiled membrane also reflects the corresponding circular shape often associated with common liquid feed mechanisms, such as a wick or tubing.

The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise at least one aerosol-former. An aerosol-former is any suitable known compound or mixture of compounds that, in use, facilitates formation of a dense and stable aerosol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The liquid aerosol-forming substrate may comprise water.

The liquid aerosol-forming substrate may comprise nicotine and at least one aerosol former. The aerosol former may comprise glycerine. The aerosol-former may comprise propylene glycol. The aerosol former may comprise both glycerine and propylene glycol. The liquid aerosol-forming substrate may have a nicotine concentration of between about 2% and about 10%.

Conveniently, the actuator may comprise one or more piezo-actuators. By piezo-actuator is meant piezo-electric actuator. Piezo-actuators are preferred because they provide an energy-efficient and lightweight means of inducing vibration of the membrane, possessing a high energy conversion efficiency from electric to acoustic/mechanical power. Further, piezo-actuators are available in a wide variety of materials and shapes. For a piezo-actuator, inputting an electrical driving signal to the piezo-actuator would result in a mechanical output in the form of a vibration signal. The piezo-actuator may be coupled to the membrane such that the vibration signal is conveyed to the membrane. Tuning and adjustment of the electrical driving signal being input to the piezo-actuator may result in corresponding changes in the output vibration signal, thereby enabling the actuator to activate different vibration modes of the membrane. Other types of actuator or transducer may be employed. For example, magnetostrictive transducers may be used, but would need more input power relative to the use of piezo-actuators, plus the working frequency range is more restricted and they require a magnetic field. By way of a further example, electrostrictive transducers may be used, but need higher driving currents and are much more sensitive to temperature change than piezo-actuators, thereby affecting performance. Piezomagnetic transducers may also be used, are bipolar, but suffer similar limitations to magnetostrictive transducers. Combinations of different types of actuator or transducer are possible, for example in layered structures or in parallel, although this would increase design complexity for the aerosol-generating device.

Optimum energy transfer from the membrane to individual aerosol droplets will occur when all of the nozzles are located precisely at the antinodes. However, an aerosol droplet formation having acceptable quality (for example, with no visible Rayleigh break-up, or little to no variation in droplet size and velocity) may result if the majority of the plurality of nozzles are spatially distributed within a short distance either side of the antinodes.

Preferably, at least 60% of the plurality of nozzles are located within a region extending either side of the antinodes, the region being where the magnitude of displacement of the membrane is at least 60% of the magnitude of displacement of the membrane at the antinodes for the corresponding one or more predetermined modal frequencies. All of the plurality of nozzles may be located within this region. In other embodiments, at least 70%, or at least 80%, or at least 90%, or all of the plurality of nozzles are located within a region extending either side of the antinodes, the region being where the magnitude of displacement of the membrane is at least 60%, or at least 70%, or at least 80% of the magnitude of displacement of the membrane at the antinodes for the corresponding one or more predetermined modal frequencies. The greater the proportion of the plurality of nozzles which are located proximate to the antinodes and the closer that proportion of nozzles are to the antinodes, the greater the quality of the resulting aerosol droplet formation produced by the aerosol-generating device. As discussed above, an improvement in quality can be indicated by a reduced tendency for Rayleigh break-up, or a reduced variation in aerosol droplet size and velocity.

Conveniently, fewer than 5% of the plurality of nozzles are located within a region extending either side of the nodes, the region being where the magnitude of displacement of the membrane is no more than 20% of the magnitude of displacement of the membrane at the antinodes for the corresponding one or more predetermined modal frequencies. At the nodes, zero or minimal energy would be conveyed to any liquid aerosol-forming substrate in contact with the membrane. Therefore, avoiding or minimising the presence of nozzles at the nodes helps to reduce the likelihood of aerosol droplets falling back and settling onto the membrane surface. Accordingly, it can be understood that avoiding or minimising the presence of nozzles at the nodes assists in reducing waste of liquid aerosol-forming substrate during use of the device. Advantageously, the membrane is free of nozzles within a region extending either side of the nodes, the region being where the magnitude of displacement of the membrane is no more than 10% of the magnitude of displacement of the membrane at the antinodes for the corresponding one or more predetermined modal frequencies. Having the membrane free of nozzles in this region either side of the nodes avoids the presence of nozzles in those parts of the membrane which would impart minimal energy to a liquid aerosol-forming substrate, and would therefore reduce the likelihood of Rayleigh break-up, as well as aerosol droplets falling back and settling onto the membrane surface.

Conveniently, the one or more predetermined modal frequencies are in a frequency range of about 50 kHz to about 300 kHz. Such a range has been found appropriate for aerosol generation. Too low a frequency may reduce volume throughput of liquid through the nozzles of the membrane, plus negatively impact fluid dynamics and the droplet breakup mechanism. Too high a frequency may risk acoustic absorption of energy in the liquid and could lead to unwanted heating effects.

To modify aerosol characteristics, frequency tuning may be employed by one or more of:

i) varying the frequency either side of a resonance mode, such as either side of one of the one or more predetermined modal frequencies;

ii) changing from one resonance mode to a different resonance mode, such as by changing from one predetermined modal frequency to a different predetermined modal frequency.

To reduce complexity in actuator configuration, it may be desirable to limit the number of predetermined modal frequencies which the actuator is configured to excite. Conveniently, the actuator is configured to excite the membrane at a single modal frequency of the membrane, thereby simplifying the complexity of the actuator design. Preferably however, the actuator is configured to excite the membrane at two or more modal frequencies. The ability to excite the membrane at two or more modal frequencies enables the aerosol droplet formation process to be varied. When the aerosol-generating device is used to aerosolise a given liquid aerosol-forming substrate, the use of different modal frequencies results in correspondingly different aerosol droplet formations; the aerosol droplet formations may differ in one or more of velocity, droplet size and droplet formation density. When the actuator is configured to induce membrane vibration at two or more modal frequencies of the membrane, the actuator may be configured to switch automatically between different vibration modes. Alternatively or in addition, switching may be achieved by manual intervention of a user who interacts with the actuator to cause the actuator to switch between different vibration modes. By way of non-limiting example, the actuator may comprise or be coupled to a dial, a button, a toggle or any equivalent feature with which a user may engage their fingers, so as to cause the actuator to switch between different vibration modes.

The one or more predetermined frequencies may comprise a plurality of modal frequencies, such as a first modal frequency which is the lowest, a second modal frequency which is higher than the first modal frequency, a third modal frequency which is higher than the second modal frequency, and so on. Limiting the number of discrete modal frequencies which the actuator is configured to excite in the membrane provides a balance between: i) the capability to generate different aerosol droplet formations during use of the aerosol-generating device and ii) reducing complexity and weight of the actuator and the device.

Preferably, the one or more predetermined modal frequencies comprise a first predetermined modal frequency of the membrane and a second predetermined modal frequency of the membrane, in which the plurality of nozzles are preferentially located in a first and a second intersection region of the aerosol-generation zone, in which: for the first intersection region, antinodes corresponding to the first predetermined modal frequency of the membrane are proximate to nodes corresponding to the second predetermined modal frequency of the membrane; and for the second intersection region, antinodes corresponding to the second predetermined modal frequency of the membrane are proximate to nodes corresponding to the first predetermined modal frequency of the membrane. In the context of this preferred embodiment, the term “preferentially located” refers to more than 50% of the plurality of nozzles being located in the first and second intersection regions. Further, in the context of this preferred embodiment, the term "proximate" refers to the antinodes corresponding to the first predetermined modal frequency of the membrane being closer to the nodes corresponding to the second predetermined modal frequency than to the antinodes corresponding to the second predetermined modal frequency (and vice-versa). An advantage of preferentially locating the plurality of nozzles in the first and second intersection regions as described above, is that exciting the membrane at the first predetermined modal frequency would result in the majority of aerosol droplets being generated by the nozzles of the first intersection region. Switching to exciting the membrane at the second predetermined modal frequency would then result in the majority of aerosol droplets instead being generated by the nozzles of the second intersection region. Increasing the proportion of the plurality of nozzles located in the first and second intersection regions is desirable.

Advantageously, all of the plurality of nozzles of the aerosol generation zone are located in the first and second intersection regions. In such an advantageous example, exciting the membrane at the first predetermined modal frequency would result in aerosol droplets being exclusively generated by the nozzles of the first intersection region, with switching to exciting the membrane at the second predetermined modal frequency resulting in aerosol droplets instead being exclusively generated by the nozzles of the second intersection region. The features described in this paragraph provide a possibility of generating different aerosol droplet formations from different parts of the membrane at different corresponding modal frequencies.

For the first intersection region, the nodes corresponding to the second predetermined modal frequency may be located within a first zone extending either side of the antinodes corresponding to the first predetermined modal frequency, the first zone being where the magnitude of displacement of the membrane is at least 60%, or at least 70%, or at least 80% of the magnitude of displacement of the membrane at the antinodes for the first predetermined modal frequency. Additionally or alternatively, for the second intersection region, the nodes corresponding to the first predetermined modal frequency may be located within a second zone extending either side of the antinodes corresponding to the second predetermined modal frequency, the second zone being where the magnitude of displacement of the membrane is at least 60%, or at least 70%, or at least 80% of the magnitude of displacement of the membrane at the antinodes for the second predetermined modal frequency. This relative spacing of the antinodes for the first predetermined modal frequency from the nodes of the second predetermined modal frequency (and vice-versa) provides a benefit of increased uniformity in the aerosol droplet formations (and properties thereof) emanating from the holes of each intersection region.

Conveniently, the nozzles of the first intersection region differ from the nozzles of the second intersection region in one or both of shape and size. The differing in one or both of shape and size provides for additional customisation of the aerosol droplet formation (and properties thereof) produced by the first and second intersection regions.

The modal frequencies of the membrane and corresponding displacement response of the membrane will be dependent on the physical properties of the membrane, as well as loads and boundary constraints acting on the membrane. For example, the Young's modulus, Poisson's ratio and the mass density of the membrane may each individually influence the modal response of the membrane, such as in changing one or both of the modal frequency and modal shape associated with a given vibration mode. Explaining further, an increase in mass density of the membrane will result in a reduction in the modal frequency of a given vibration mode of the membrane, assuming all other parameters remain unchanged. Providing a membrane having homogenous material properties throughout the membrane may provide for easier manufacturing of the membrane. However, conveniently the membrane may be formed to have material properties which are non-homogenous. Such non-homogenous material properties may provide for tuning of the modal shapes, modal frequencies and thereby the aerosol droplet formation.

Preferably, the device is configured to selectively apply and release a constraint to the membrane so as to adjust the response of the membrane to the one or more predetermined modal frequencies. Changing boundary constraints acting on the membrane when the membrane is excited at a given frequency will also have the effect of changing the displacement response of the membrane to that frequency. A change in the displacement response of the membrane for a given frequency may result in a change in the location of the antinodes. Preferably, the device is configured to selectively apply and release the constraint along one or more portions of the periphery of the membrane. By way of example, the constraint may be a clamped constraint. The aerosol-generation device may also comprise an electromechanical switch, in which the constraint is selectively applied and released from the membrane by operation of the electromechanical switch. The use of an electromechanical switch provides a simple, yet effective, means of changing a constraint acting on the membrane to adjust the response of the membrane to being excited at a given frequency. The electromechanical switch conveniently acts to selectively apply and release the constraint proximate a peripheral edge of the membrane.

By way of non-limiting example, the membrane may be secured in place around its periphery by the use of a segmented clamp in which discrete clamp segments extend about the periphery, with the device configured to selectively release and apply one or more of the clamp segments. Conveniently, the segmented clamp is comprised as part of the actuator of the aerosol-generating device.

Preferably, the actuator is configured to selectively excite different parts of the membrane. By way of non-limiting example, the actuator may comprise a plurality of actuator segments, each actuator segment coupled to a different part of the membrane. Conveniently, each of the plurality of actuator segments are elements which are distinct and physically separate from each other; by way of example only, each distinct and separate element may be provided with its own set of electrodes for providing drive thereto. To provide additional customisation of the vibration modes to be excited in the membrane, each of the actuator segments may be driven independently of the other segments. Independently drivable actuator segments may enable the phase of operation of one or more of the segments to be varied relative to the other segments, thereby providing the ability to excite vibration modes in the membrane having complex displacement responses. Conveniently, the plurality of actuator segments are coupled to the membrane proximate to the periphery of the membrane.

The actuator may be configured to apply a modulated driving signal to the membrane in order to excite the membrane. By way of example, the spectrum of the modulated signal may contain a frequency component that is a natural frequency of the membrane and is a higher harmonic frequency of the membrane. In one embodiment, the actuator may be configured to excite a vibration mode having a 100 kHz to 200 kHz sine carrier with a 1 kHz to 20 kHz AM sine modulation.

The modal frequencies of the membrane and corresponding displacement response of the membrane will also vary dependent on the physical dimensions of the membrane. The thickness of the membrane may progressively change when traversing from a central region of the membrane towards the periphery of the membrane. Preferably, the membrane progressively reduces in thickness from the central region of the membrane towards the periphery of the membrane. For example, in the case of a circular or elliptical membrane clamped about its periphery, a progressive reduction in thickness of the membrane when moving away from the centre of the membrane would reduce variation in the displacement at the antinodes across a diameter of the membrane when the membrane is excited at one of the higher harmonic frequencies. Alternatively, the membrane may progressively increase in thickness from the central region of the membrane towards the periphery of the membrane.

According to another aspect of the present invention, there is provided an aerosol-delivery system, the system comprising:

the aerosol-generating device as described above;

the system further comprising:

a liquid feed operable to supply a liquid aerosol-forming substrate to the membrane.

Conveniently, the aerosol-delivery system further comprises a replaceable cartridge, the cartridge containing a reservoir of the liquid aerosol-forming substrate. The cartridge may additionally comprise the liquid feed.

The liquid feed may comprise tubing for conveying the liquid aerosol-forming substrate from a reservoir of the liquid aerosol-forming substrate to the membrane. The liquid feed may further comprise a feed nozzle through which the liquid aerosol-forming substrate may be ejected adjacent to a surface of the membrane. Conveniently, the liquid feed takes the form of tubing extending between a reservoir end and a membrane end, with the tubing terminating in the feed nozzle at the membrane end. The liquid feed may comprise one or more wicking materials. The use of wicking materials in the liquid feed allows for the passage of the liquid aerosol-forming substrate to the membrane to be more gradual and controlled.

The liquid feed may be static relative to the membrane, thereby simplifying the design of the aerosol-generating device. Preferably however, the liquid feed is configured to traverse along the aerosol-generation zone of the membrane during excitation of the membrane by the actuator, in order to supply the liquid aerosol-forming substrate to nozzles proximate to antinodes corresponding to the membrane being excited at the one or more predetermined modal frequencies. The use of such a traversable liquid feed may help to reduce the weight of the device, by allowing use of a liquid feed having a smaller surface area footprint than a static liquid feed able to cover the same surface area of the aerosol-generation zone.

Conveniently, the plurality of nozzles comprises a first plurality of nozzles and a second plurality of nozzles located in respective first and second regions of the aerosol-generation zone. The liquid feed may comprise a first liquid feed and a second liquid feed, in which the first liquid feed is operable to supply a first liquid aerosol-forming substrate to the first region and the second liquid feed is operable to supply a second liquid to the second region, wherein the first liquid aerosol-forming substrate and the second liquid aerosol-forming substrate are different to each other. The actuator is operable to excite the membrane at the one or more predetermined modal frequencies in order that, in use, the first and second liquid aerosol-forming substrates passing through the respective first and second plurality of nozzles are aerosolised. This embodiment has a benefit of allowing different liquid aerosol-forming substrates to be aerosolised from different regions of the membrane. The first and second liquid aerosol-forming substrates may differ from each other in any of their physical and chemical properties; for example, in one or more of their mass density, viscosity and surface tension. The first and second regions of the aerosol-generation zone may be selected to have different vibration characteristics to each other when excited at a given modal frequency. The selection of the first and second regions may be influenced by the physical properties of the respective first and second liquid aerosol-forming substrates; for example, so that aerosolised droplets of the first liquid aerosol-forming substrate from the first region are similar or identical to aerosolised droplets of the second liquid aerosol-forming substrate from the second region in one or more of droplet velocity, droplet size, and Weber number.

Conveniently, the membrane is elliptical or circular in plan, with the first and second regions being concentrically arranged relative to each other. Further, the first liquid feed and the second liquid feed may be concentrically arranged so as to supply the respective first and second liquid aerosol-forming substrates to the corresponding first and second regions. The provision of concentrically arranged first and second liquid feeds with a membrane which is circular or elliptical in plan takes advantage of the fact that the vibration modes for such an circular or elliptical membrane will include a displacement pattern in which the antinodes and nodes are arranged in concentric bands.

The first and second liquid feeds may alternatively comprise respective first and second linear channels, with the first and second linear channels arranged to supply the first and second liquid aerosol-forming substrates to the respective first and second regions of the aerosol generation zone. Additionally, the first and second linear channels may conveniently be formed as part of an integral body, with the body positioned over the aerosol generation zone to ensure that the first and second linear channels are located adjacent the corresponding first and second regions. The use of liquid feeds in the form of linear channels as described in this paragraph is particularly suitable when using a membrane which is rectangular or square in plan, as the antinodes for different vibration modes of the membrane are also likely to follow a linear path.

Conveniently, the first plurality of nozzles and the second plurality of nozzles are both preferentially located proximate to antinode locations corresponding to a common predetermined modal frequency of the membrane, the actuator configured to excite the membrane to induce a vibration response of the membrane at the common predetermined modal frequency. The first liquid feed and the second liquid feed may be configured to supply the respective first and second liquid aerosol-forming substrates to the respective first and second regions simultaneously. The first plurality of nozzles and the second plurality of nozzles may be configured in one or both of size and shape such that when the membrane is excited at the common predetermined modal frequency, the Weber number of the first liquid aerosol-forming substrate passing through the first plurality of nozzles is within 10% of the value of the Weber number of the second liquid aerosol-forming substrate passing through the second plurality of nozzles.

In a further non-limiting embodiment, the first plurality of nozzles may be preferentially located proximate to antinodes corresponding to the membrane being excited at a first predetermined modal frequency of the membrane and the second plurality of nozzles is preferentially located proximate to antinodes corresponding to the membrane being excited at a second predetermined modal frequency of the membrane, in which the first liquid aerosol-forming substrate feed is configured to supply the first liquid aerosol-forming substrate to the first region in synchronisation with the actuator exciting the membrane at the first predetermined modal frequency, and the second liquid aerosol-forming substrate feed is configured to supply the second liquid aerosol-forming substrate to the second region in synchronisation with the actuator exciting the membrane at the second predetermined modal frequency. Preferably, the aerosol-delivery system is in the form of a consumer device for delivery of non-thermally generated aerosol. Advantageously, the aerosol-delivery system is a smoking system for non-thermally generating an inhalable aerosol. For example, during use of the aerosol-delivery system, aerosol droplets produced by vibration of the membrane of the aerosol-generating device form the inhalable aerosol. The smoking system may be in the form of an elongate smoking article. The smoking system may comprise an elongate housing containing the aerosol-generating device and the liquid feed, the elongate housing having a distal end and a mouth end, with a mouthpiece provided at the mouth end. Conveniently, the elongate housing is cylindrical. The aerosol-generating device and the liquid feed are preferably arranged within the elongate housing such that aerosolised droplets ejected from the membrane would subsequently flow through the mouthpiece to exit the housing. Preferably, the elongate housing is sized and shaped to facilitate the housing being held between the thumb and fingers of a user of the smoking system. The smoking system may further comprise a power source and electronic control circuitry, the electronic control circuitry configured for controlling operation of the actuator, the power source configured to provide electrical power to the electronic control circuitry and the actuator of the aerosol-generating device. The electronic control circuitry and the power source are preferably contained within the elongate housing. Preferably, the power source is rechargeable; for example, the power source may comprise a lithium ion battery. When the power source is rechargeable, the electronic control circuitry may also be configured to control charging of the power source. As no heat is used in the generation of the aerosol, there is a reduced risk of producing harmful compounds, as these are usually associated with chemical reactions occurring at higher temperatures. Further, as the membrane of the aerosol-generating device is responsive to changes induced by the actuator, there is the capability to modify the aerosol characteristics over the duration of single puff (typically of 2-3 seconds duration). This may be achieved by modifying the electric driving signal for the actuator within the duration of a puff, thereby allowing the generation of aerosol to be quickly adapted to the needs of a user. The aerosol-delivery system can be described as a "puff-on-demand" system.

In various embodiments of the aerosol-delivery system, different liquids may be fed individually to the membrane; for example, a first liquid containing nicotine or other stimulant substances and a second liquid containing flavours may each be individually fed to the membrane. These different liquids may be fed to different regions of the membrane, with each region being responsive to different vibration modes activated by the actuator. Such an aerosol-delivery system may result in droplets ejected from different regions of the membrane having a different chemical composition. For example, where nicotine is present in a first liquid and flavouring is present in the second liquid, the delivery of these two different liquids to different regions of the membrane may be such that nicotine is present in smaller aerosol droplets and flavouring is present in larger aerosol droplets, so as to provide improved user satisfaction. Having the nicotine instead being present in the relatively larger sized aerosol droplets would have a disadvantage of risking irritation of the throat of the user. The feeding of the liquids may be synchronized with a driving signal of the actuator. By way of example, a micropump or a valve may be operated to feed one liquid when the actuator is activated in one mode, with a different liquid instead being fed by operating a different micropump or switching a state of the valve when the actuator is activated in another mode. The user may have the option to tune or select their own personalised puff profile, which may take the form of a given electric driving signal signature for the actuator, to provide preferred aerosol characteristics.

Although preferably the smoking system is for non-thermal generation of aerosol, optionally, the smoking system comprises a heater element configured to apply heat to the liquid aerosol-forming substrate, either before or after aerosolisation of the substrate, i.e. upstream or downstream of the membrane. Preferably, the smoking system comprises a replaceable cartridge, the cartridge positioned within the elongate housing and containing a reservoir of the liquid aerosol-forming substrate. Optionally, the cartridge additionally comprises the liquid feed.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating device comprising: a membrane having an aerosol-generation zone, in which the aerosol-generation zone comprises a plurality of nozzles, the plurality of nozzles being the only nozzles in the aerosol-generation zone; and an actuator coupled to the membrane; wherein the actuator is configured to excite the membrane to induce a vibration of the membrane at one or more predetermined modal frequencies of the membrane in order that, in use, a liquid aerosol-forming substrate passing through the plurality of nozzles is aerosolised; wherein the plurality of nozzles are preferentially located proximate to antinodes corresponding to the membrane being excited at the one or more predetermined modal frequencies of the membrane.

Example Ex2: The aerosol-generating device according to example Ex1, in which the plurality of nozzles are non-homogenously distributed over the aerosol-generation zone.

Example Ex3: The aerosol-generating device according to either of examples Ex1 or Ex2, wherein at least 60%, or at least 70%, or at least 80%, or at least 90% of the plurality of nozzles are located within a region extending either side of the antinodes, the region being where the magnitude of displacement of the membrane is at least 60%, or at least 70%, or at least 80% of the magnitude of displacement of the membrane at the antinodes for the corresponding one or more predetermined modal frequencies.

Example Ex4: The aerosol-generating device according to example Ex3, wherein all of the plurality of nozzles are located within the region extending either side of the antinodes.

Example Ex5: The aerosol-generating device according to any of examples Ex1 to Ex3, wherein fewer than 5% of the plurality of nozzles are located within a region extending either side of the nodes, the region being where the magnitude of displacement of the membrane is no more than 20% of the magnitude of displacement of the membrane at the antinodes for the corresponding one or more predetermined modal frequencies.

Example Ex6: The aerosol-generating device according to any of examples Ex1 to Ex5, wherein the aerosol-generation zone is free of nozzles within a region extending either side of the nodes, the region being where the magnitude of displacement of the membrane is no more than 10% of the magnitude of displacement of the membrane at the antinodes for the corresponding one or more predetermined modal frequencies.

Example Ex7: The aerosol-generating device according to any of examples Ex1 to Ex6, in which the one or more predetermined frequencies comprise a plurality of modal frequencies.

Example Ex8: The aerosol-generating device according to any of examples Ex1 to Ex7, in which the one or more predetermined modal frequencies comprise a first predetermined modal frequency of the membrane and a second predetermined modal frequency of the membrane, in which the plurality of nozzles are preferentially located in a first and a second intersection region of the aerosol-generation zone, in which: for the first intersection region, antinodes corresponding to the first predetermined modal frequency of the membrane are proximate to nodes corresponding to the second predetermined modal frequency of the membrane; and for the second intersection region, antinodes corresponding to the second predetermined modal frequency of the membrane are proximate to nodes corresponding to the first predetermined modal frequency of the membrane.

Example Ex9: The aerosol-generating device according to example Ex8, in which all of the plurality of nozzles are located in the first and second intersection regions.

Example Ex10: The aerosol-generating device according to either of example Ex8 or Ex9, in which: for the first intersection region, the nodes corresponding to the second predetermined modal frequency are located within a first zone extending either side of the antinodes corresponding to the first predetermined modal frequency, the first zone being where the magnitude of displacement of the membrane is at least 60%, or at least 70%, or at least 80% of the magnitude of displacement of the membrane at the antinodes for the first predetermined modal frequency; and for the second intersection region, the nodes corresponding to the first predetermined modal frequency are located within a second zone extending either side of the antinodes corresponding to the second predetermined modal frequency, the second zone being where the magnitude of displacement of the membrane is at least 60%, or at least 70%, or at least 80% of the magnitude of displacement of the membrane at the antinodes for the second predetermined modal frequency.

Example Ex11: The aerosol-generating device according to any of examples Ex1 to Ex10, in which the device is configured to selectively apply and release a constraint to the membrane so as to adjust the response of the membrane to the one or more predetermined modal frequencies.

Example Ex12: The aerosol-generating device according to example Ex11, in which the device is configured to selectively apply and release the constraint along one or more portions of the periphery of the membrane.

Example Ex13: The aerosol-generating device according to either of example Ex11 or Ex12, in which the constraint is a clamped constraint.

Example Ex14: The aerosol-generating device according to any of examples Ex11 to Ex13, the device further comprising an electromechanical switch, in which the constraint is selectively applied and released from the membrane by operation of the electromechanical switch.

Example Ex15: The aerosol-generating device according to example Ex14, in which the electromechanical switch is configured to selectively apply and release the constraint proximate to a peripheral edge of the membrane.

Example Ex16: The aerosol-generating device according to any of examples Ex1 to Ex15, in which the actuator is configured to selectively excite different parts of the membrane.

Example Ex17: The aerosol-generating device according to example Ex16, in which the actuator comprises a plurality of actuator segments, each actuator segment coupled to a different part of the membrane.

Example Ex18: The aerosol-generating device according to example Ex17, in which the plurality of actuator segments are coupled to the membrane proximate to the periphery of the membrane.

Example Ex19: The aerosol-generating device according to any of examples Ex1 to Ex18, in which the actuator is configured to apply a modulated driving signal to the membrane in order to excite the membrane.

Example Ex20: The aerosol-generating device according to any of examples Ex1 to Ex19, in which the membrane progressively reduces in thickness from a central region of the membrane towards the periphery of the membrane.

Example Ex21: An aerosol-delivery system, the system comprising: the aerosol-generating device according to any of examples Ex1 to Ex20; the system further comprising: a liquid feed operable to supply a liquid aerosol-forming substrate to the membrane.

Example Ex22: The aerosol-delivery system according to example Ex21, in which the liquid feed is configured to traverse along the aerosol-generation zone of the membrane during excitation of the membrane by the actuator, in order to supply the liquid aerosol-forming substrate to nozzles proximate to antinodes corresponding to the membrane being excited at the one or more predetermined modal frequencies.

Example Ex23: The aerosol-delivery system according to either of example Ex21 or Ex22, in which the plurality of nozzles comprise a first plurality of nozzles and a second plurality of nozzles located in respective first and second regions of the aerosol-generation zone; the liquid feed comprising a first liquid feed and a second liquid feed, in which the first liquid feed is operable to supply a first liquid aerosol-forming substrate to the first region and the second liquid feed is operable to supply a second liquid aerosol-forming substrate to the second region; wherein the first liquid aerosol-forming substrate and the second liquid aerosol-forming substrate are different to each other; wherein the actuator is operable to excite the membrane at the one or more predetermined modal frequencies in order that, in use, the first and second liquid aerosol-forming substrates passing through the respective first and second plurality of nozzles are aerosolised.

Example Ex24: The aerosol-delivery system according to example Ex23, in which the membrane is elliptical or circular in plan, the first and second regions being concentrically arranged relative to each other, the first liquid feed and the second liquid feed concentrically arranged relative to each other so as to supply the respective first and second liquid aerosol-forming substrates to the corresponding first and second regions.

Example Ex25: The aerosol-delivery system according to either of example Ex23 or 24, in which the first plurality of nozzles and the second plurality of nozzles are both preferentially located proximate to antinode locations corresponding to a common predetermined modal frequency of the membrane, the actuator configured to excite the membrane to induce a vibration of the membrane at the common predetermined modal frequency.

Example Ex26: The aerosol-delivery system according to example Ex25, in which the first liquid feed and the second liquid feed are configured to supply the respective first and second liquid aerosol-forming substrates to the respective first and second regions simultaneously.

Example Ex27: The aerosol-delivery system according to either of example Ex25 or Ex26, in which the first plurality of holes and the second plurality of holes are configured in one or both of size and shape such that when the membrane is excited at the common predetermined modal frequency, the Weber number of the first liquid aerosol-forming substrate passing through the first plurality of holes is within 10% of the value of the Weber number of the second liquid aerosol-forming substrate passing through the second plurality of holes.

Example Ex28: The aerosol-delivery system according to either of example Ex23 or Ex24 in which the first plurality of holes is preferentially located proximate to antinodes corresponding to the membrane being excited at a first predetermined modal frequency of the membrane and the second plurality of holes is preferentially located proximate to antinodes corresponding to the membrane being excited at a second predetermined modal frequency of the membrane, in which the first liquid feed is configured to supply the first liquid aerosol-forming substrate in synchronisation with the actuator exciting the membrane at the first predetermined modal frequency and the second liquid feed is configured to supply the second liquid aerosol-forming substrate in synchronisation with the actuator exciting the membrane at the second predetermined modal frequency.

Example Ex29: The aerosol-delivery system according to any of examples Ex21 to Ex28, in which the aerosol-delivery system is a smoking system for generating an inhalable aerosol.

Example Ex30: The aerosol-delivery system according to example Ex29, in which the aerosol-delivery system comprises an elongate housing containing the aerosol-generating device and the liquid feed, the elongate housing having a distal end and a mouth end, with a mouthpiece provided at the mouth end.

Example Ex31: The aerosol-delivery system according to example Ex30, further comprising a power source and electric control circuitry, the electronic control circuitry configured for controlling operation of the actuator, the power source configured to provide electrical power to the electronic control circuitry and the actuator, in which the electronic control circuitry and the power source are contained within the elongate housing.

Examples will now be further described with reference to the figures, in which.

FIG. **5*a*** shows a plan view of a circular membrane clamped about the periphery of the membrane and overlaid with contour lines indicating the displacement of different parts of the membrane in response to vibration mode (0,2) being activated in the membrane.

FIG. **5*b*** shows a plan view of a circular membrane clamped about the periphery of the membrane and overlaid with contour lines indicating the displacement of different parts of the membrane in response to vibration mode (1, 2) being activated in the membrane.

FIG. **5*c*** shows a plan view of a circular membrane clamped about the periphery of the membrane and overlaid with contour lines indicating the displacement of different parts of the membrane in response to vibration mode (3,1) being activated in the membrane.

FIG. **6*a*** shows a plan view of a square membrane simply supported about the periphery of the membrane and overlaid with contour lines indicating the displacement of different parts of the membrane in response to vibration mode (1, 2) being activated in the membrane.

FIG. **6*b*** shows a plan view of a square membrane simply supported about the periphery of the membrane and overlaid with contour lines indicating the displacement of different parts of the membrane in response to vibration mode (3, 3) being activated in the membrane.

Figure 7:
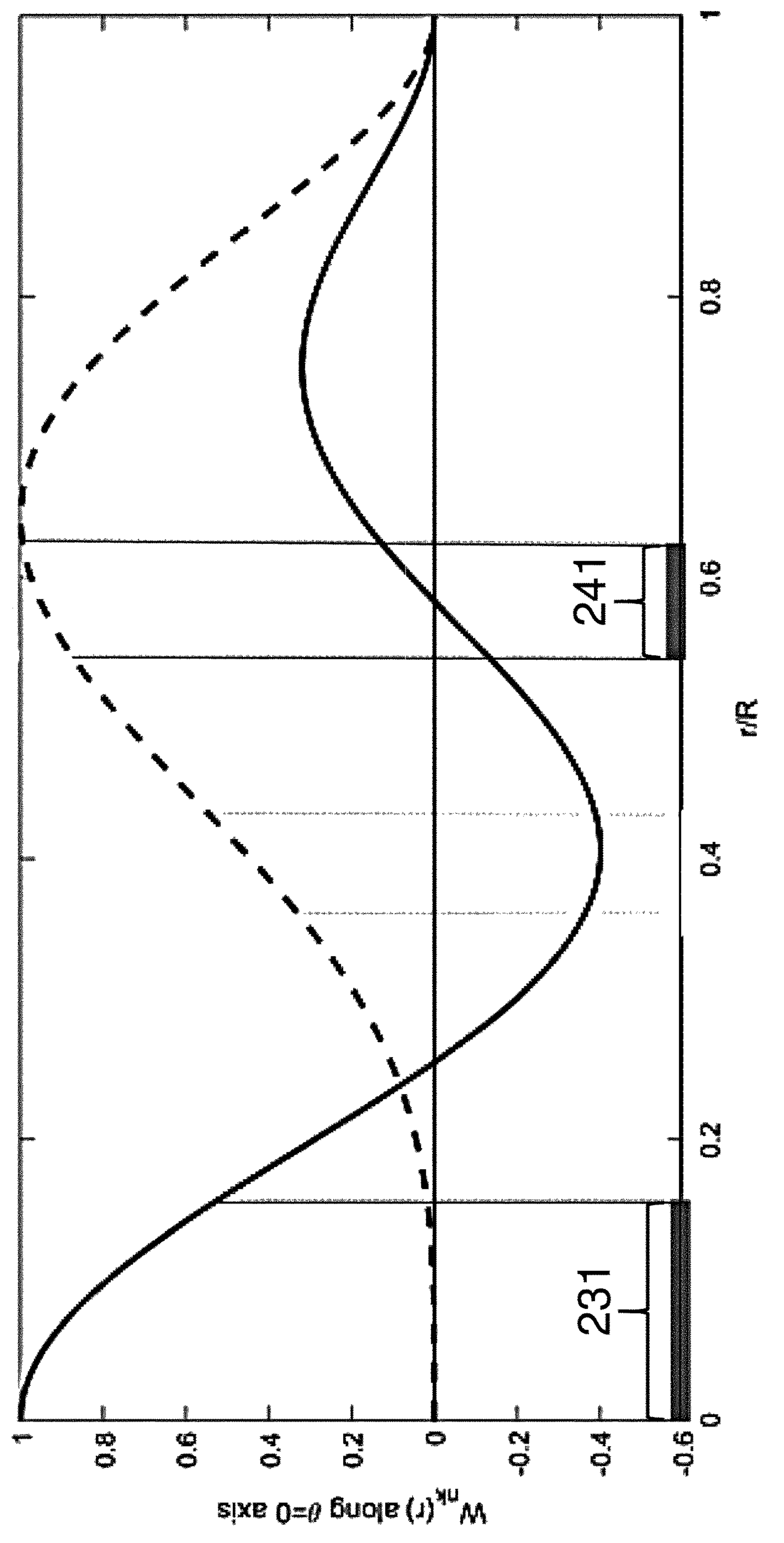

FIG. 7 shows a graph of displacement versus radial distance for a circular membrane clamped about the periphery of the membrane, in response to two separate vibration modes (0,3), and (4,1), being activated in the membrane. The graph also includes an indication of the locations of nozzles in the membrane.

Figure 8A:
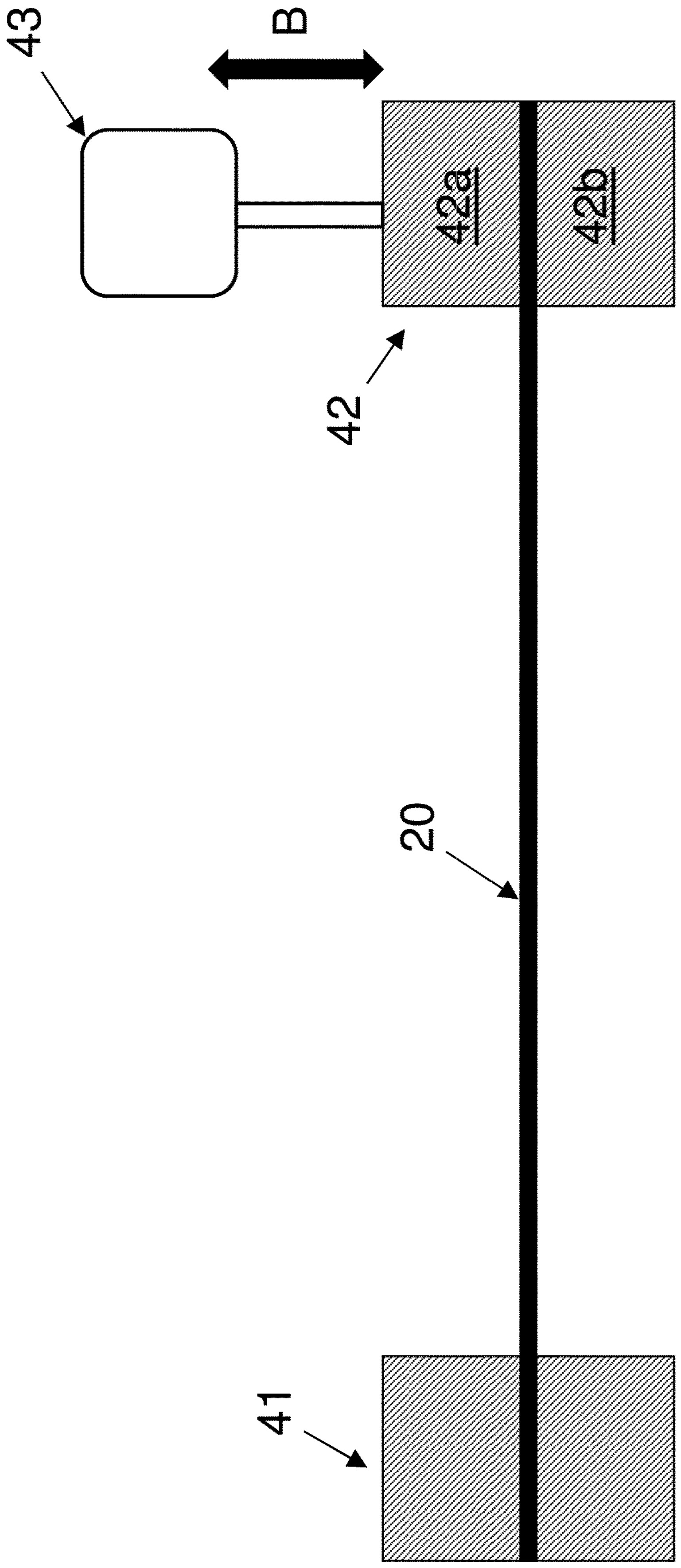

FIGS. **8*a* and 8*b* show a side elevation view of an embodiment of the aerosol-generating device configured to selectively apply and release a constraint to the membrane. FIG. 8*a* shows the constraint applied to the membrane, whereas FIG. 8*b*** shows the constraint released from the membrane.

Figure 9:
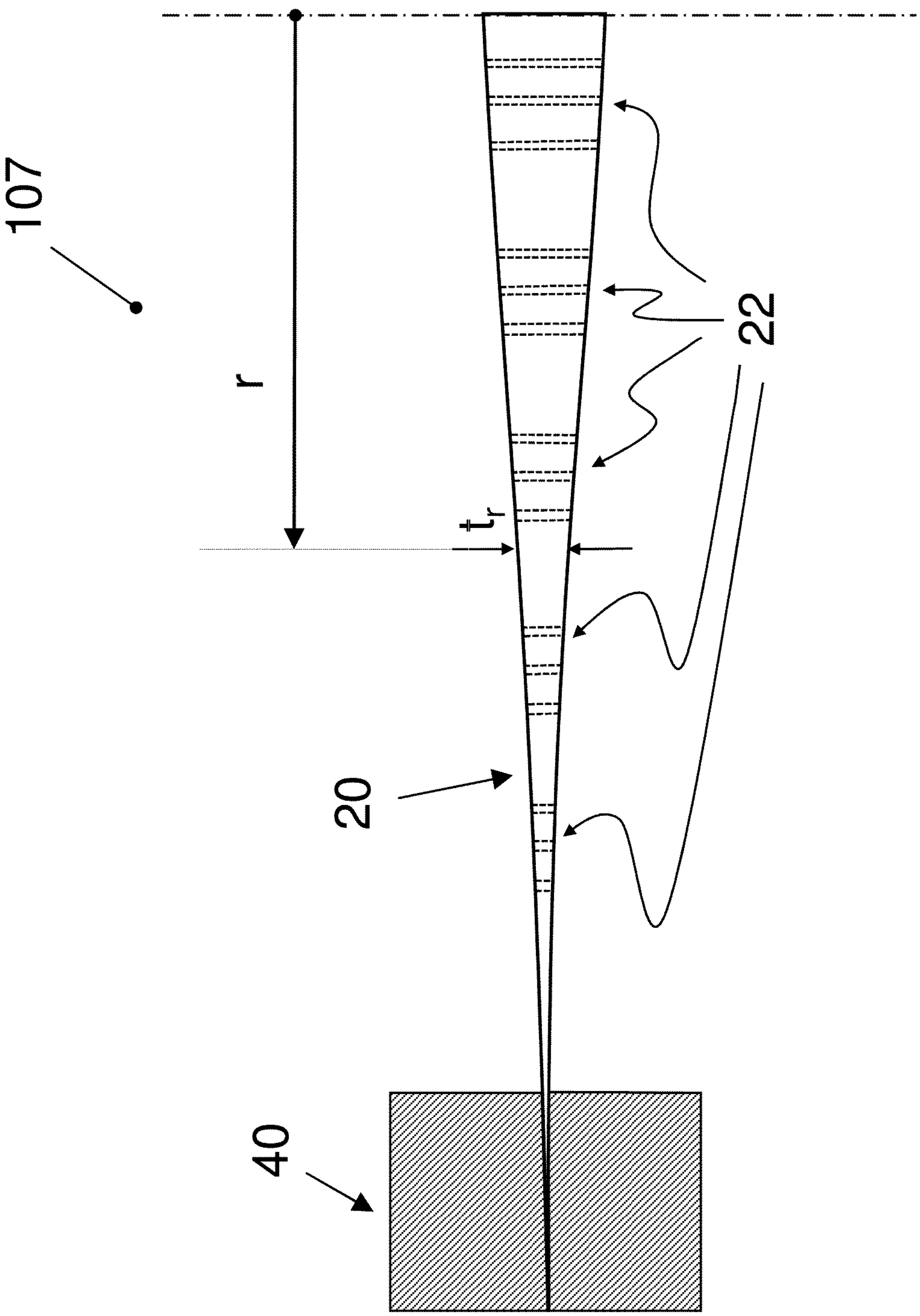

FIG. 9 shows a side elevation view of an embodiment of the aerosol-generating device in which the membrane progressively reduces in thickness when traversing from a central region of the membrane towards the periphery of the membrane.

Figure 10:
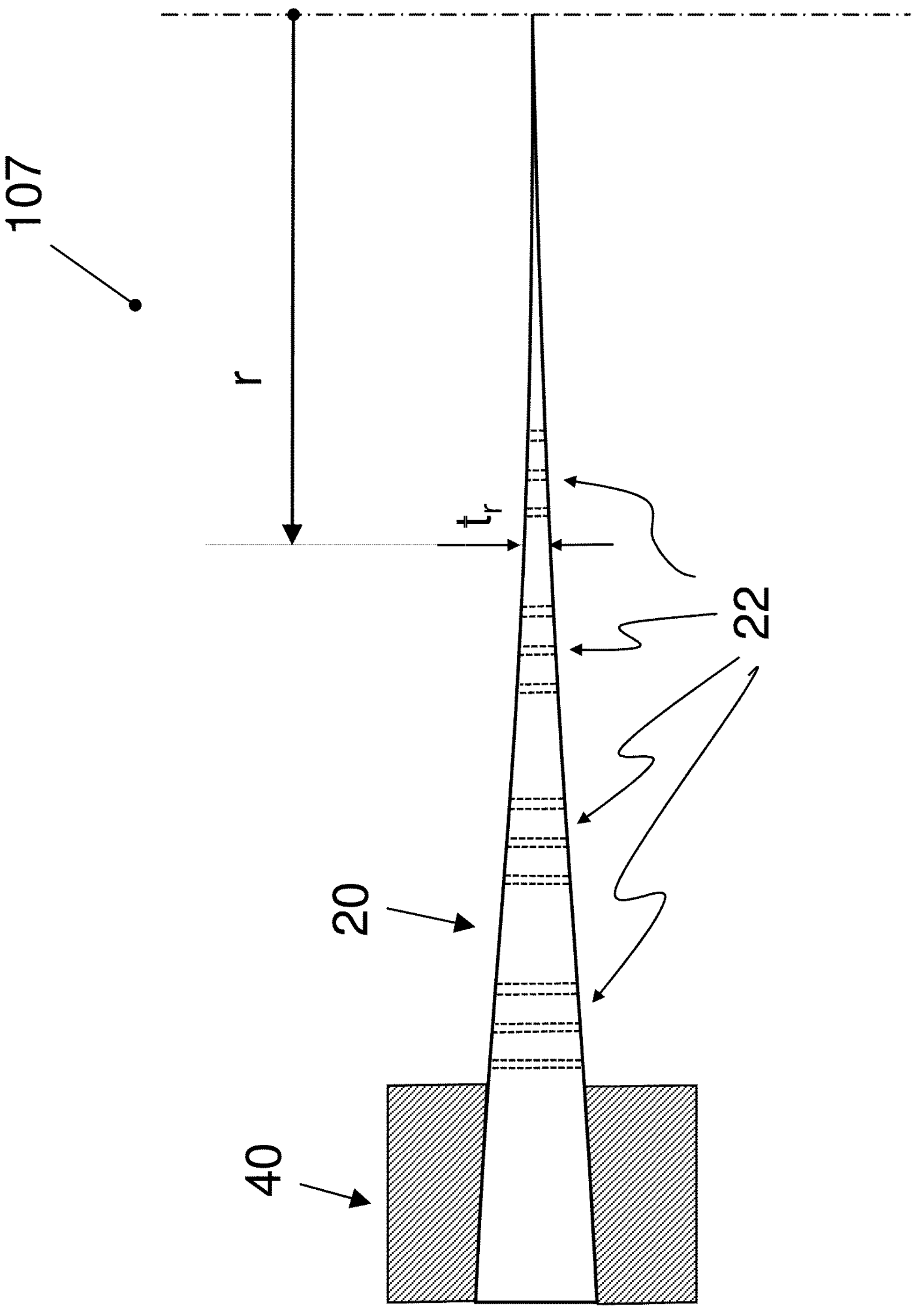

FIG. 10 shows a side elevation view of an embodiment of the aerosol-generating device in which the membrane progressively increases in thickness when traversing from the central region of the membrane towards the periphery of the membrane.

Figure 11:
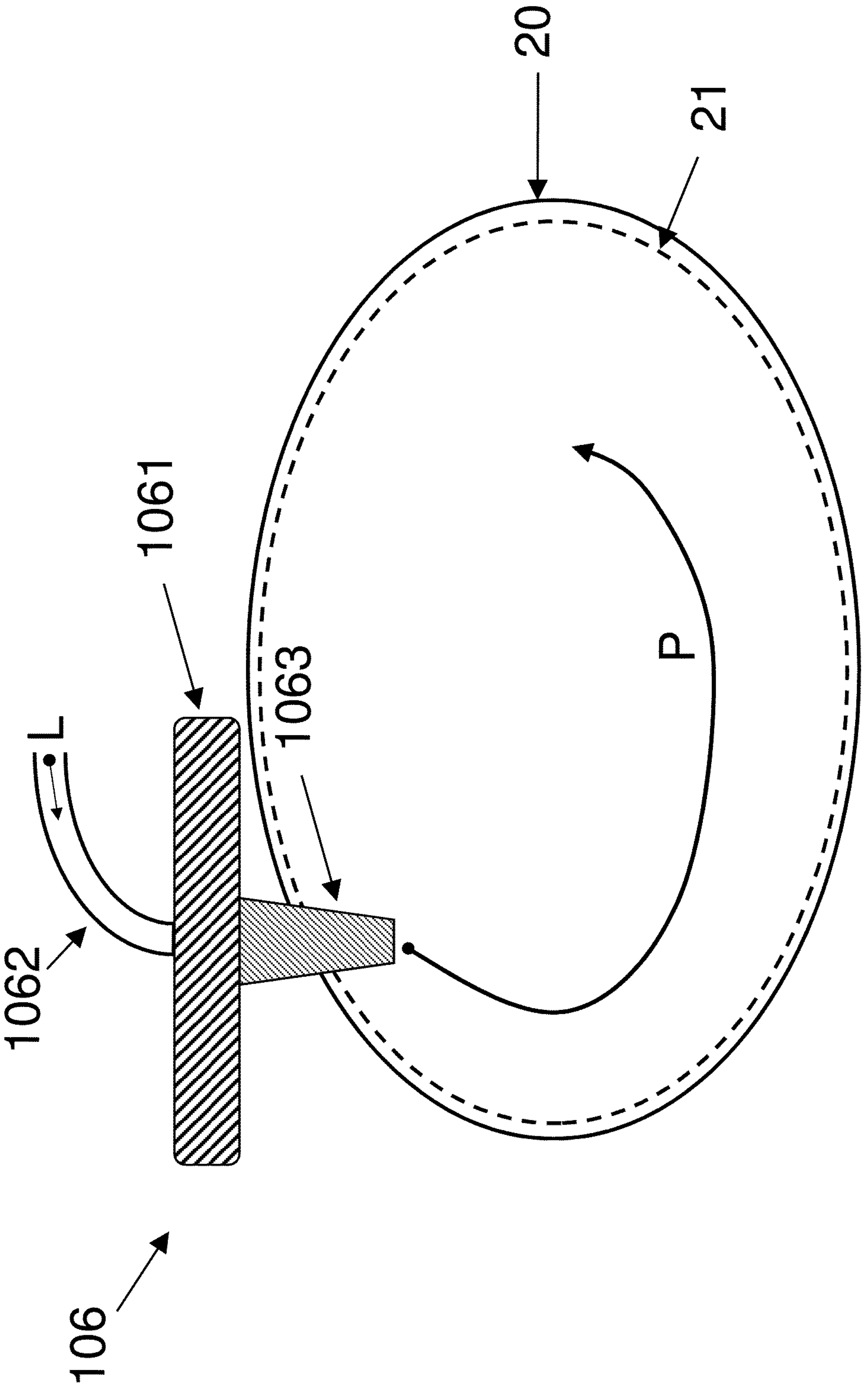

FIG. 11 shows a perspective view of a first embodiment of a liquid feed assembly.

Figure 12:
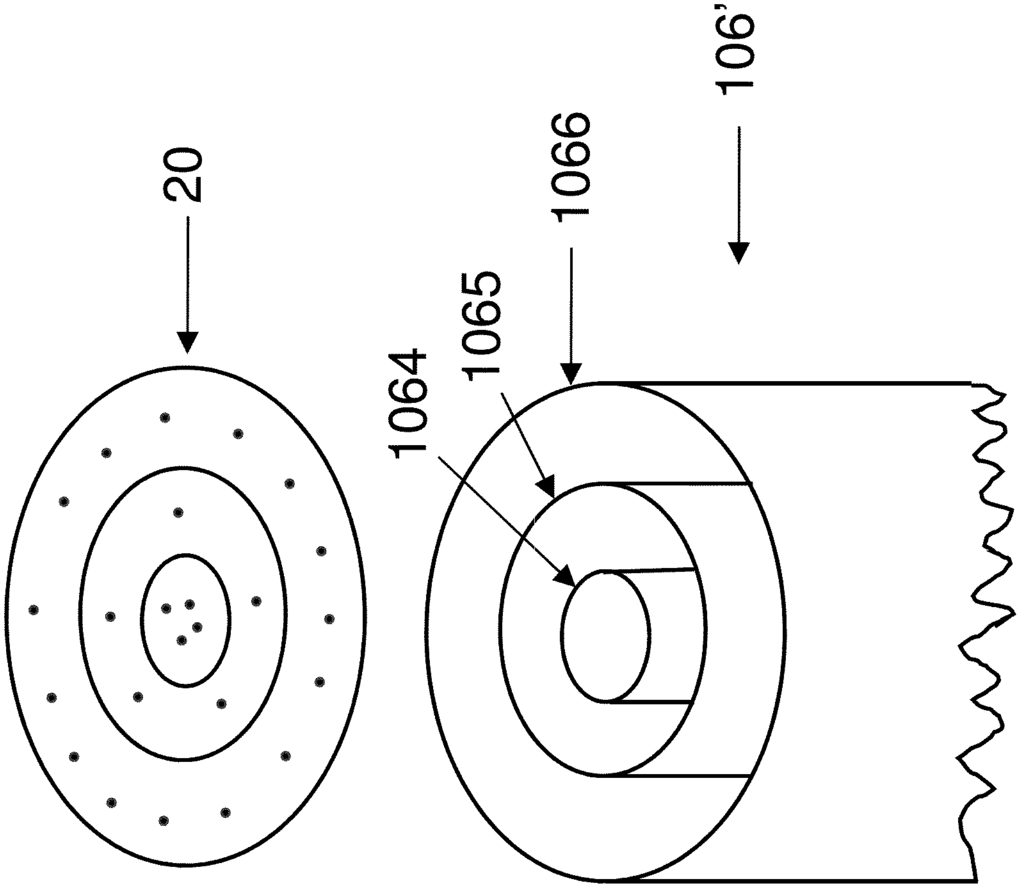

FIG. 12 shows a perspective view of a second embodiment of a liquid feed assembly.

Figure 13:
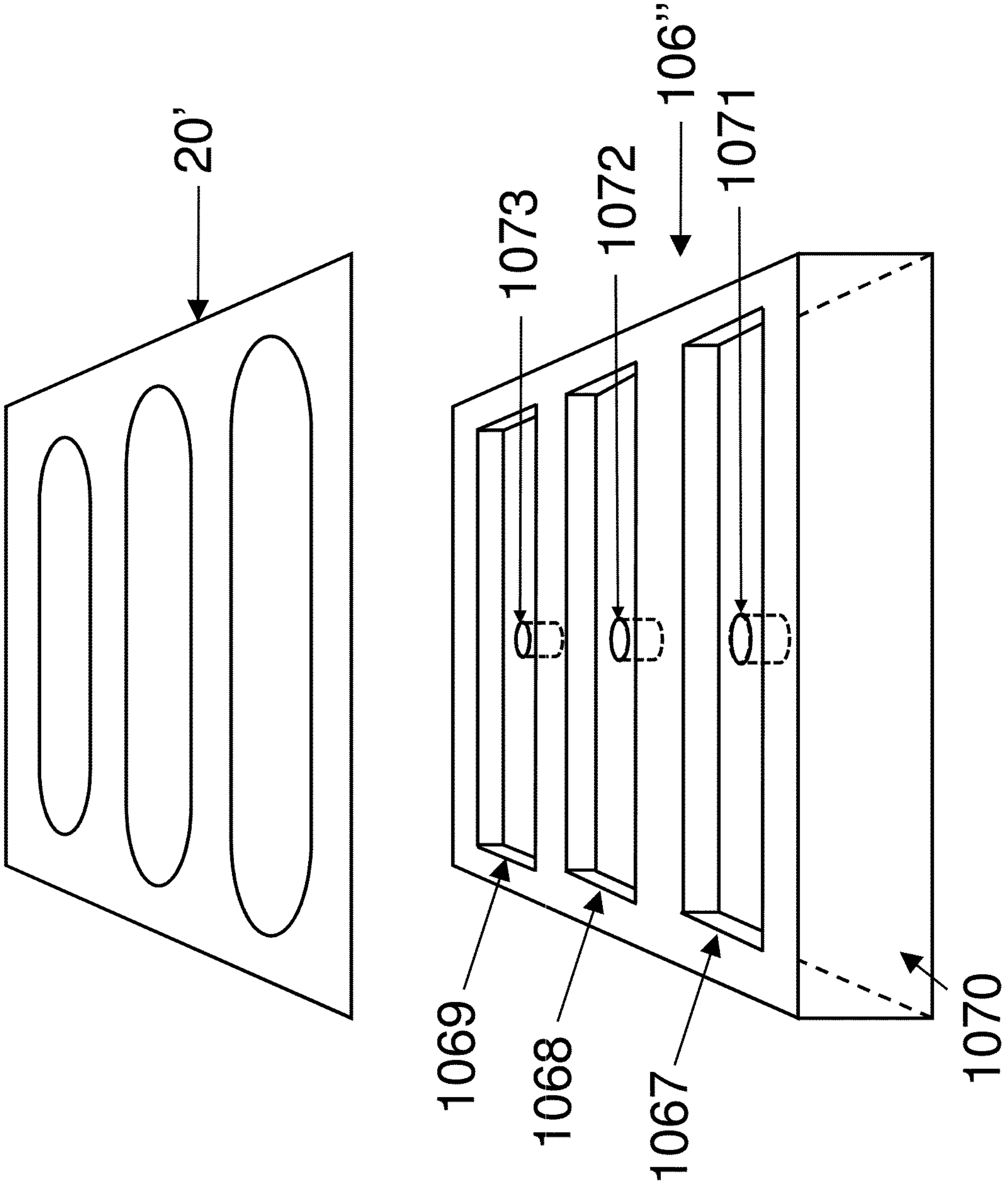

FIG. 13 shows a perspective view of a third embodiment of a liquid feed assembly.

Figure 1:
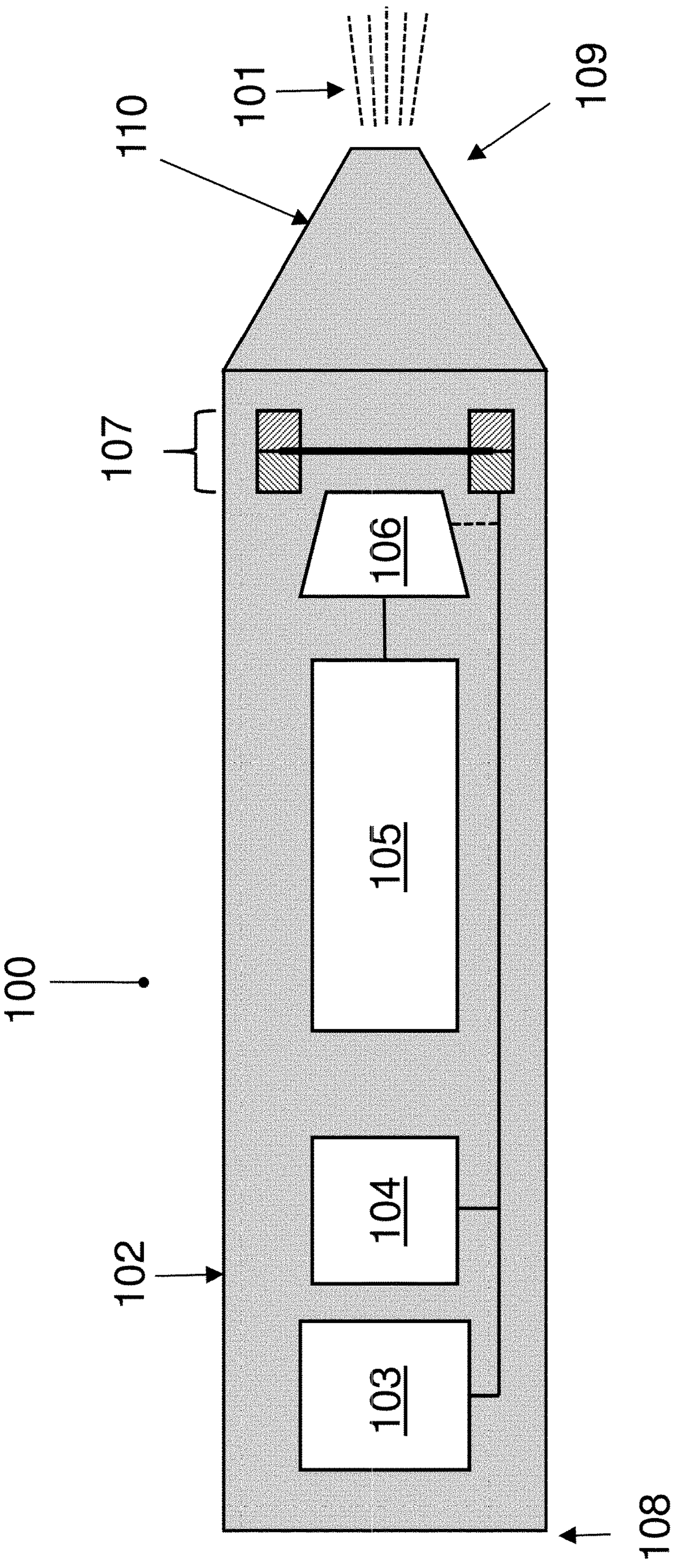
FIG. 1 shows a schematic view of an aerosol-delivery system, the aerosol-delivery system being in the form of a smoking article for generating an inhalable aerosol.

FIG. 1 is a schematic view of an aerosol-delivery system 100. For the embodiment shown in FIG. 1, the aerosol-delivery system 100 is a smoking system for generating an inhalable aerosol 101. The system 100 has an elongate housing 102. The elongate housing 102 contains a power source 103, electronic control circuitry 104, a cartridge 105, a liquid feed assembly 106 and an aerosol-generating device 107. The power source 103 is coupled to the electronic control circuitry 104 and the aerosol-generating device 107 to provide power thereto. The electronic control circuitry 104 is configured to control operation of the aerosol-generating device 107. In an alternative embodiment in which the power source 103 is a rechargeable battery, the electronic control circuitry 104 is also configured to control charging of the rechargeable battery. The elongate housing 102 has a distal end 108 and a mouth end 109. A mouthpiece 110 is provided at the mouth end 109 of the housing 102. The cartridge 105 contains a reservoir of a liquid-forming substrate (not shown). Although not shown in FIG. 1, the cartridge 105 is replaceable, with the elongate housing 102 adapted to enable the cartridge to be removed and replaced. Embodiments of exemplary aerosol-generating devices 107 suitable for use with the aerosol-delivery system 100 illustrated in FIG. 1 are described in the subsequent paragraphs.

Figure 2:
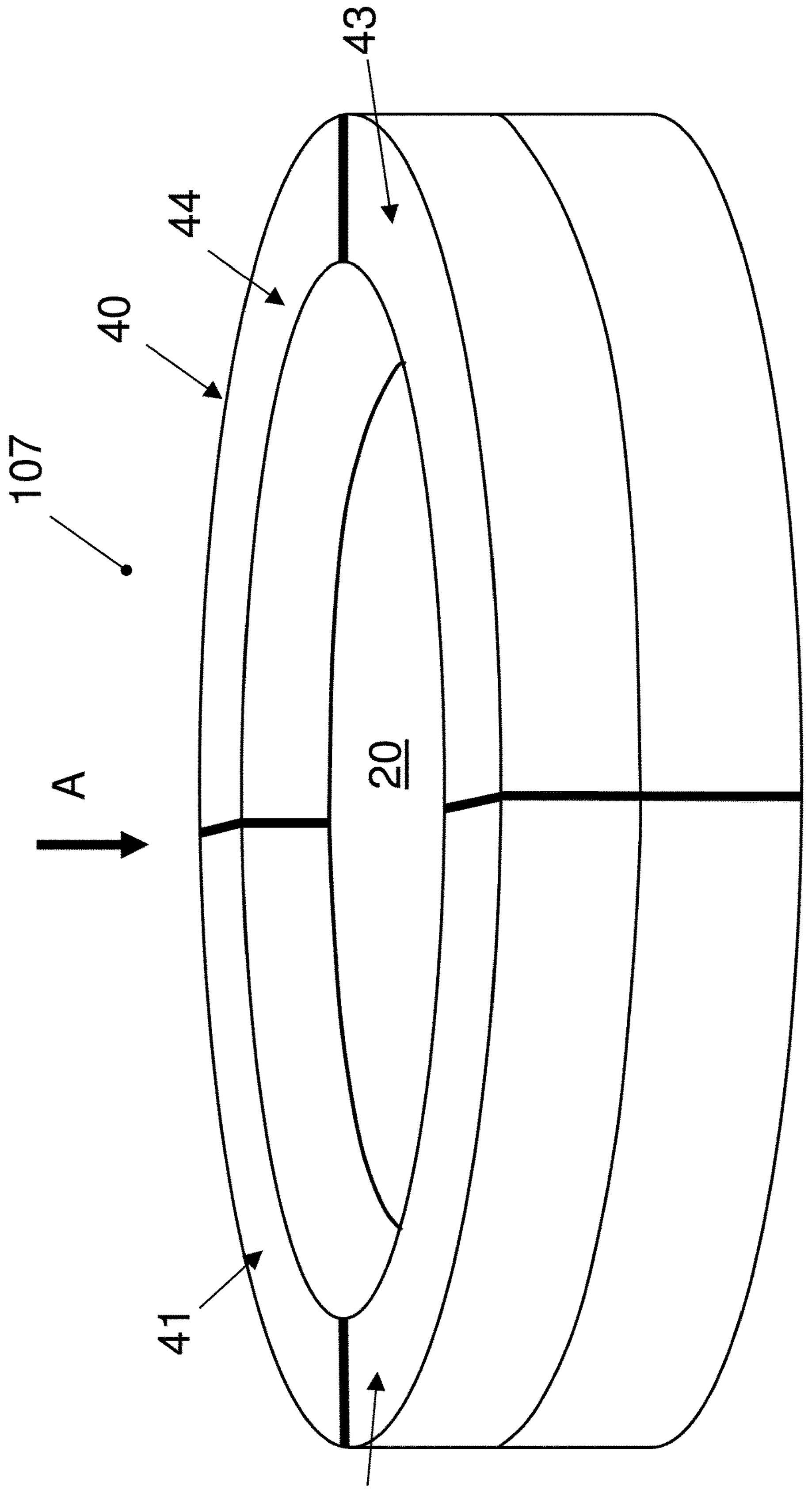
FIG. 2 shows a perspective view of an aerosol-generating device in accordance with an embodiment.

FIG. 2 illustrates an embodiment of an aerosol-generating device 107. The device 107 has a membrane 20 and an actuator 40 coupled to the membrane. For the embodiment shown in FIG. 2, the membrane 20 has a circular shape when viewed in plan. The actuator 40 is segmented about its periphery, having four discrete segments 41, 42, 43, 44. Each segment 41, 42, 43, 44 has an upper half and a lower half acting on respective upper and lower surfaces of corresponding segments of the membrane 20. Each actuator segment 41, 42, 43, 44 thereby acts to constrain the corresponding segment of the membrane 20. Each actuator segment 41, 42, 43, 44 is designed so as to be driven independently of the other segments. During operation of the actuator 40, the segments 41, 42, 43, 44 may be driven so that they are in phase with each other, or in any desired phase relationship. In an alternative embodiment not shown in the figures, the actuator 40 may be continuous and non-segmented.

Figure 3:
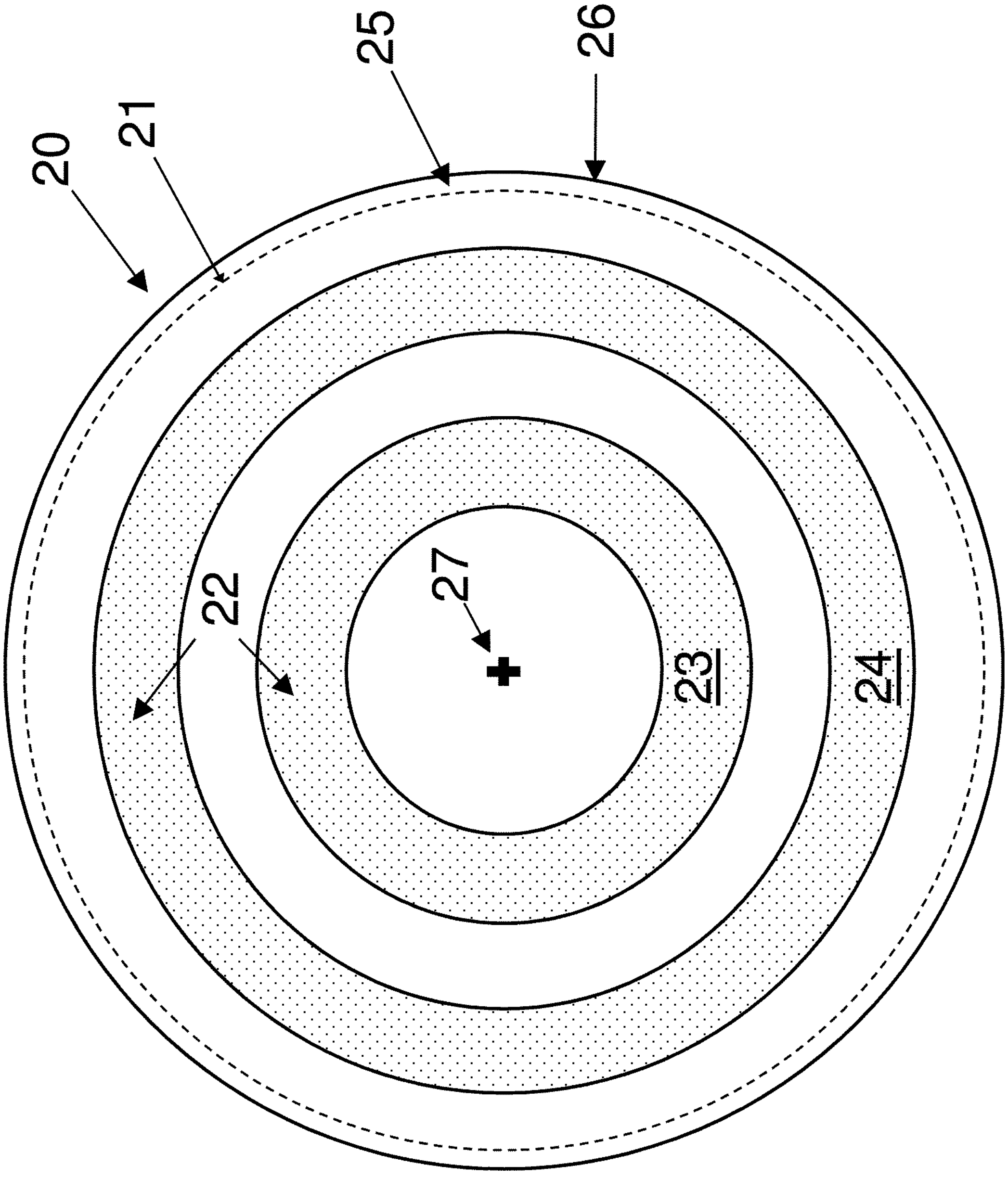
FIG. 3 shows a plan view of a membrane of the aerosol-generating device of FIG. 2.

FIG. 3 shows a plan view of the membrane 20 of the aerosol-generating device 107, i.e. when viewed in the direction of arrow A of FIG. 2. The membrane 20 is circular when viewed in plan. For convenience, the actuator 40 is excluded from FIG. 3. The membrane 20 has an aerosol-generation zone 21 (the periphery of which is represented by a dashed line in FIG. 3). The aerosol generation zone 21 is provided with a plurality of nozzles 22. The nozzles 22 are in the form of holes which extend through the thickness of the membrane 20. For the embodiment shown in FIG. 3, the plurality of nozzles 22 are exclusively located in two annular regions 23, 24. An annular gap 25 is present between the periphery 26 of the membrane 20 and the periphery of the aerosol generation zone 21. The annular gap 25 provides space to enable the segments of the actuator 40 (see for example, FIG. 2) to be coupled to the membrane 20.

The actuator 40 is configured to excite the membrane 20 to induce a vibration of the membrane at one or more predetermined modal frequencies of the membrane. In various embodiments, the actuator 40 may be configured to be excite the membrane 20 to induce a vibration of the membrane at multiple discrete modal frequencies of the membrane. However, for ease of understanding, the displacement of the membrane 20 in response to the actuator 40 exciting a single vibration mode of the membrane will initially be discussed, with the discussion referring to FIG. 4. Each vibration mode of the membrane 20 will have a corresponding modal frequency.

Figure 4:
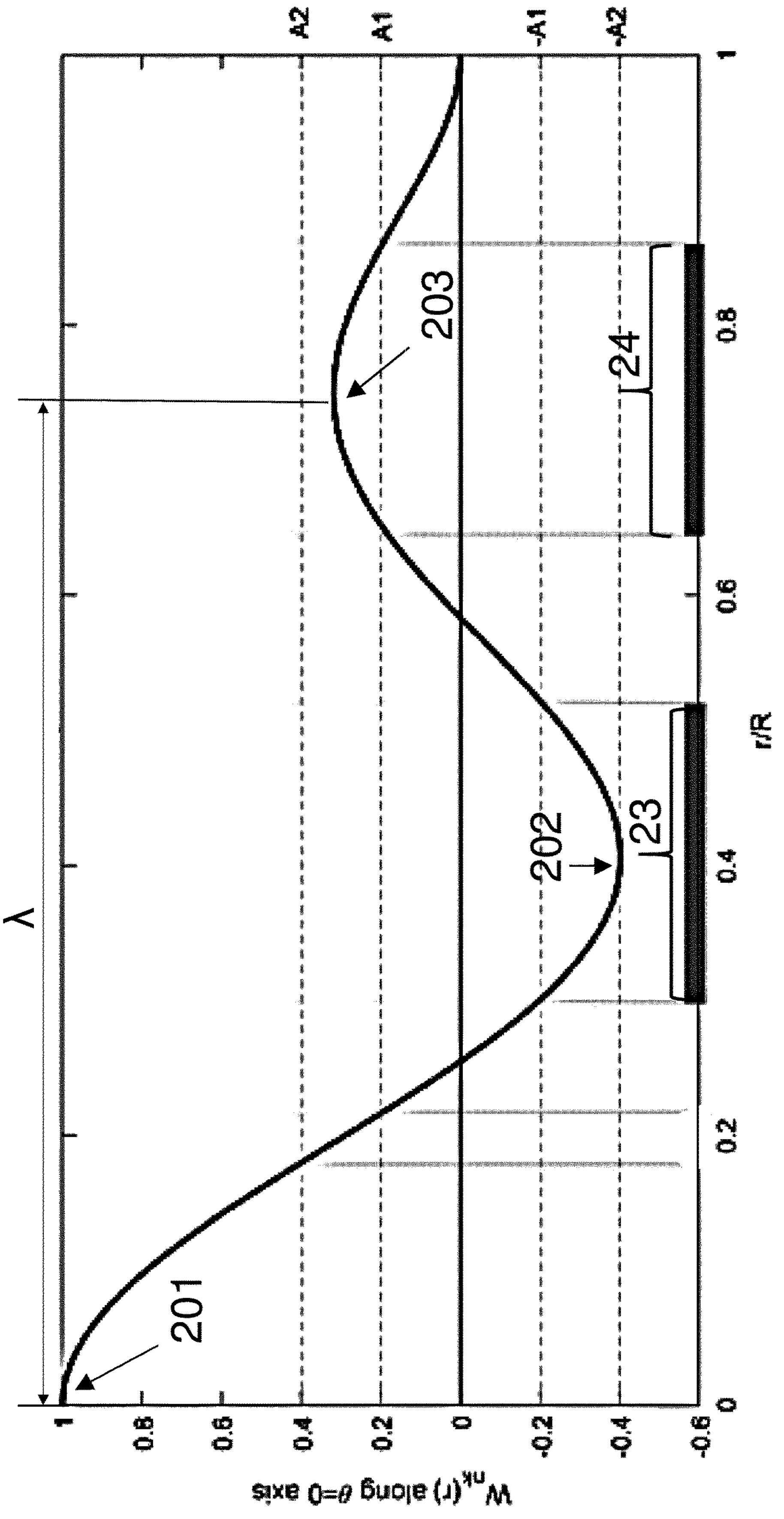
FIG. 4 shows a graph of displacement versus radial distance for a circular membrane clamped about the periphery of the membrane, in response to vibration mode (0,3) being activated in the membrane. The graph also includes an indication of the locations of nozzles in the membrane.

FIG. 4 shows a graph of displacement of the circular membrane 20 versus radial distance, r, from the centre 27 of the membrane 20 (see FIG. 3) for vibration mode (0, 3) of the membrane, with the entire periphery 26 of the membrane clamped by the actuator 40. The radial distance, r, in FIG. 4 is expressed as a fraction of the radius, R, of the aerosol generation zone 21. For mode (0, 3), the number 0 indicates that no circumferential vibration mode is activated in the membrane 20, whereas the number 3 indicates that the third harmonic vibration mode in the radial direction (relative to the centre 27 of the membrane) is activated.

As illustrated in FIG. 4, when mode (0,3) is activated in the membrane 20, antinodes are present at three regions of the membrane. The displacement shown in FIG. 4 is annular about the centre 27 of the membrane 20 for mode (0,3), having three defined antinode regions 201, 202, 203 corresponding to the locations of the antinodes. The antinode displacement magnitude is a maximum at the centre 27 of the membrane 20 (i.e. in antinode region 201), and progressively reduces with increasing radial distance from the centre towards the periphery 26 of the membrane (i.e. see antinode regions 202, 203). The reduction in magnitude of the displacement at the antinodes with increasing radial distance, r, is due to the periphery 26 of the membrane 20 being clamped by the actuator 40 (see FIG. 2). FIG. 4 includes grey bands showing the width of the annular regions 23, 24 in which the plurality of nozzles 22 are provided. The annular regions 23, 24 are localised about (i.e. proximate to) the corresponding antinodes (see antinode regions 202, 203 in FIG. 4). The wavelength, λ, of a waveform associated with this vibration mode (0,3) is indicated on FIG. 4.

When a liquid aerosol-forming substrate is supplied to the membrane 20 while the actuator 40 activates mode (0,3) of the membrane, aerosol droplets will be generated by the nozzles 22 located in the annular regions 23, 24. As these annular regions 23, 24, and thereby the plurality of nozzles 22, are localised about the antinodes (i.e. antinode regions 202, 203) for vibration mode (0,3), the energy and velocity imparted to the aerosol droplets by the membrane 20 will be maximised. Such an arrangement of nozzles 22 localised about the antinodes 202, 203 will also enhance the Weber number and the distance which the membrane 20 is able to eject aerosol droplets from the membrane. If the actuator 40 was instead, or additionally, configured to excite a different vibration mode in the membrane, then the plurality of nozzles 22 would be preferentially located proximate to the antinodes corresponding to that different vibration mode.

FIGS. 5*a-c* and FIGS. 6*a-b* illustrate the displacement response of different membrane geometries to different vibration modes.

Figure 5A:
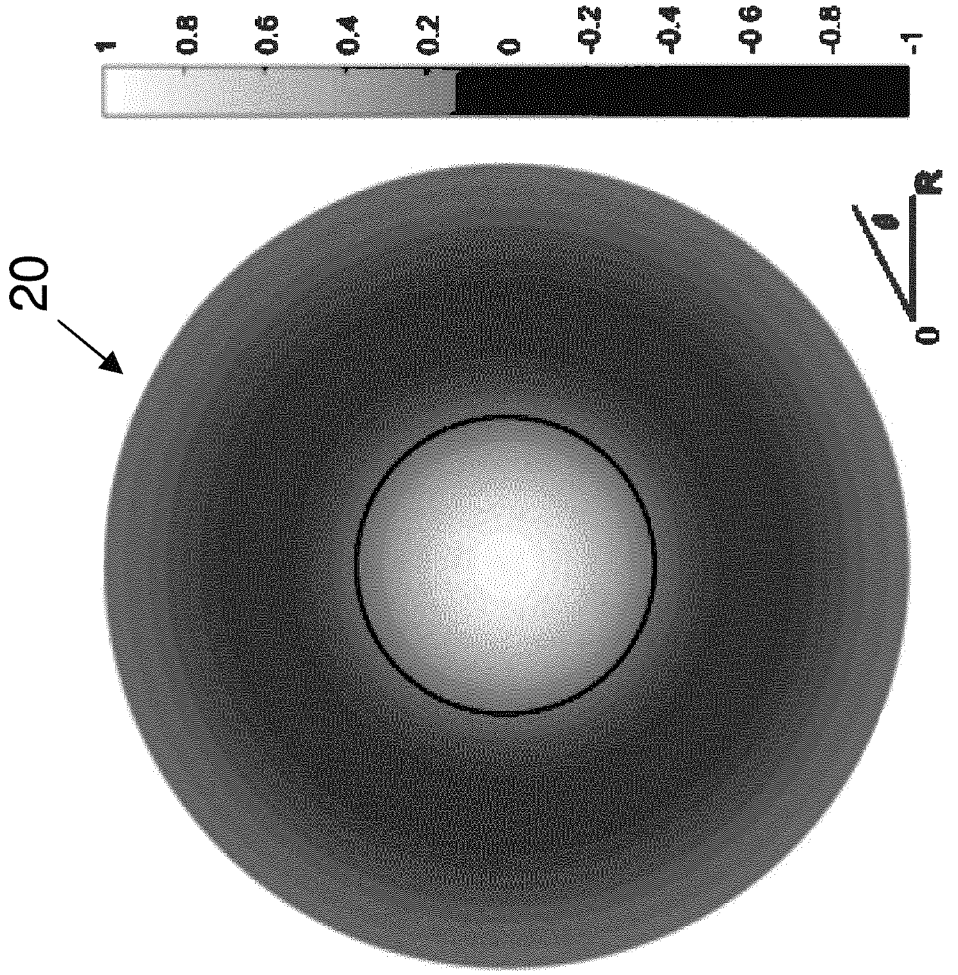
Figure 5B:
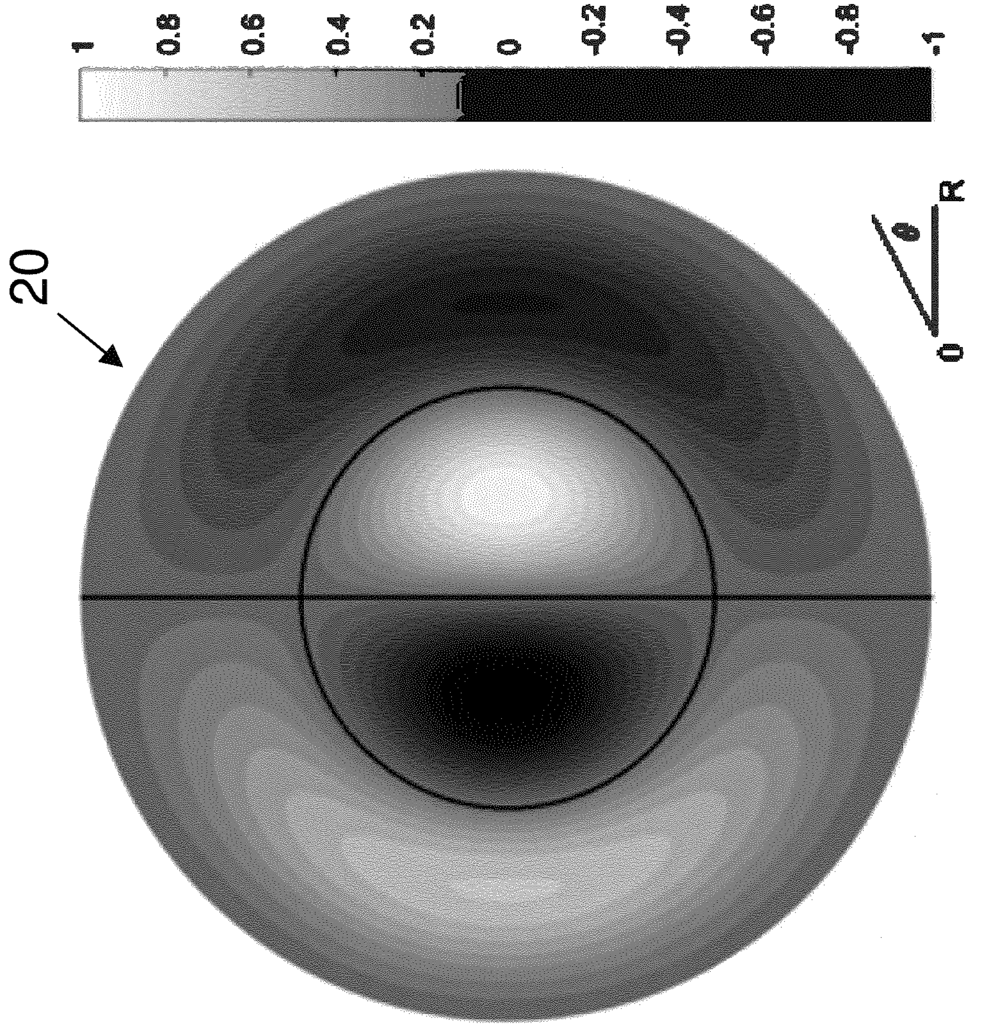
Figure 5C:
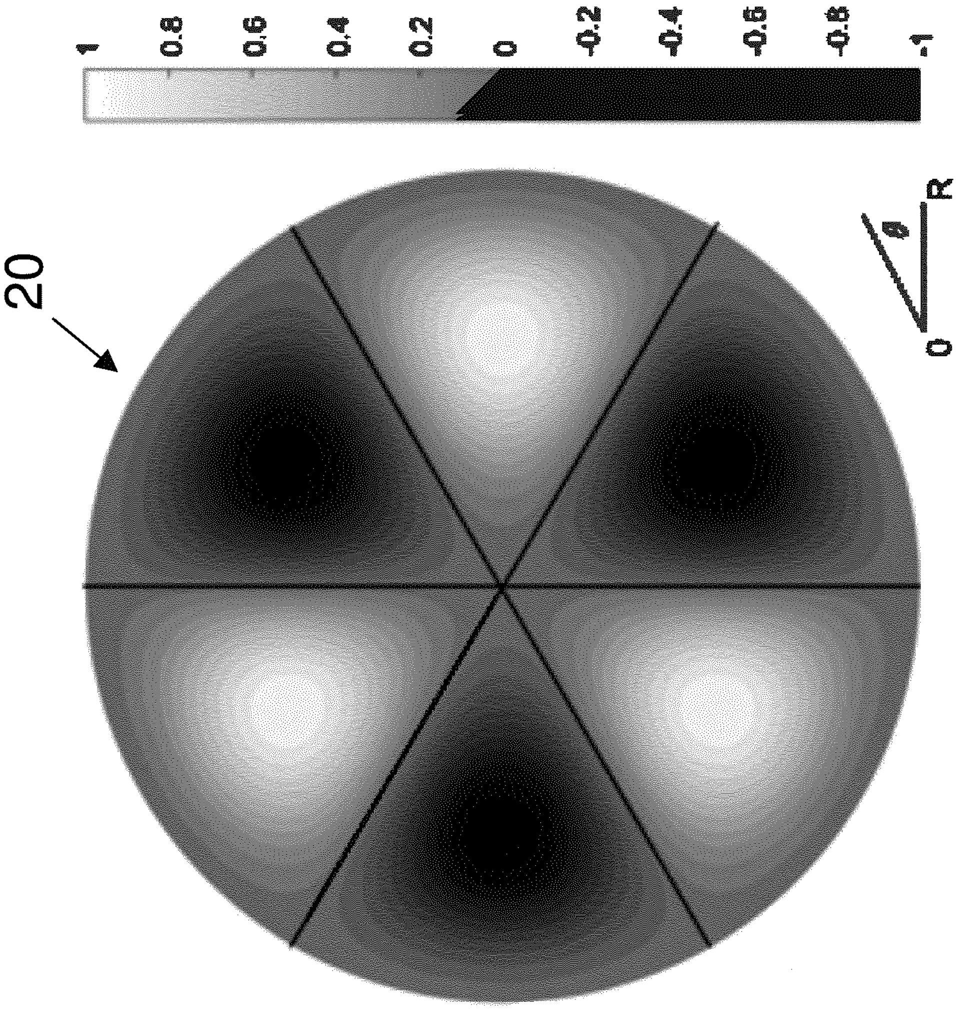

FIGS. 5*a* to 5*c* show plan views of a circular membrane 20 clamped about the periphery 26 of the membrane for different vibration modes. Each vibration mode will have its own corresponding modal frequency. Graduated contours are overlaid on the membrane 20 for each of FIGS. 5*a* to 5*c*, illustrating the displacement response of different parts of the membrane to the particular vibration mode.

FIG. 5*a* shows the displacement of the clamped circular membrane 20 for vibration mode (0,2). For mode (0, 2), the number 0 indicates that no circumferential vibration mode is activated in the membrane 20, whereas the number 2 indicates that the second harmonic vibration mode in the radial direction (relative to the centre 27 of the membrane) is activated. The displacement response of the membrane 20 for this vibration mode has two defined antinode regions along a line extending radially out from the centre 27 of the membrane.

FIG. 5*b* shows the displacement of the clamped circular membrane 20 for vibration mode (1,2). For mode (1,2), the number 1 indicates that the fundamental circumferential vibration mode is activated in the membrane 20, whereas the number 2 indicates that the second harmonic vibration mode in the radial direction (relative to the centre 27 of the membrane) is activated. The displacement response of the membrane 20 for this vibration mode has a single antinode region in a circumferential direction for each half of the membrane, as well as two antinode regions along a line extending radially out from the centre 27 of the membrane.

FIG. 5*c* shows the displacement response of the clamped circular membrane 20 for vibration mode (3,1). For mode (3, 1), the number 3 indicates that the third harmonic circumferential vibration mode is activated in the membrane 20, whereas the number 1 indicates that the fundamental vibration mode in the radial direction (relative to the centre 27 of the membrane is activated. The displacement response of the membrane 11 for this vibration mode has three antinode regions in a circumferential direction for each half of the membrane, as well as one antinode region along a line extending radially out from the centre 27 of the membrane.

Figure 6A:
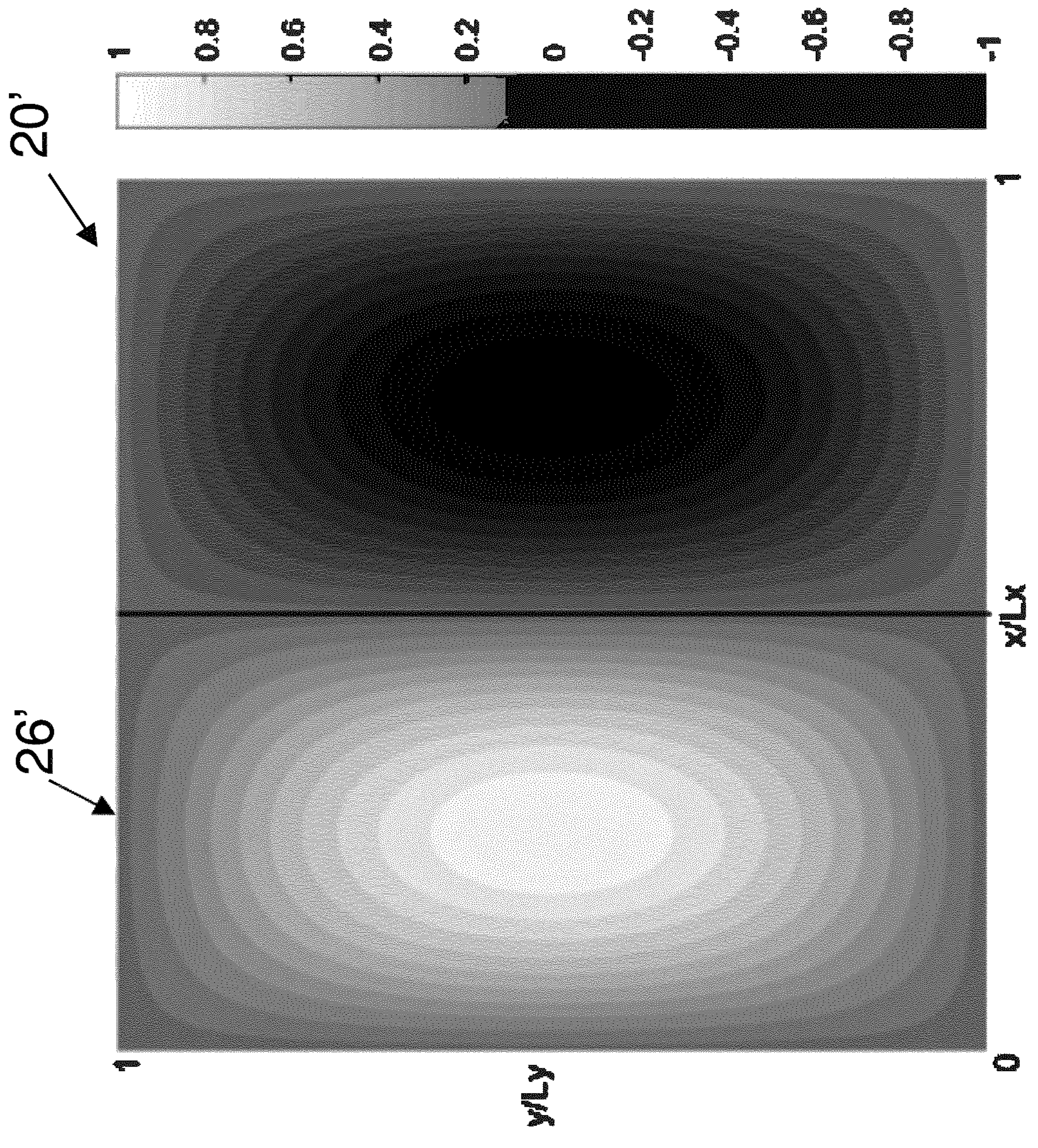
Figure 6B:
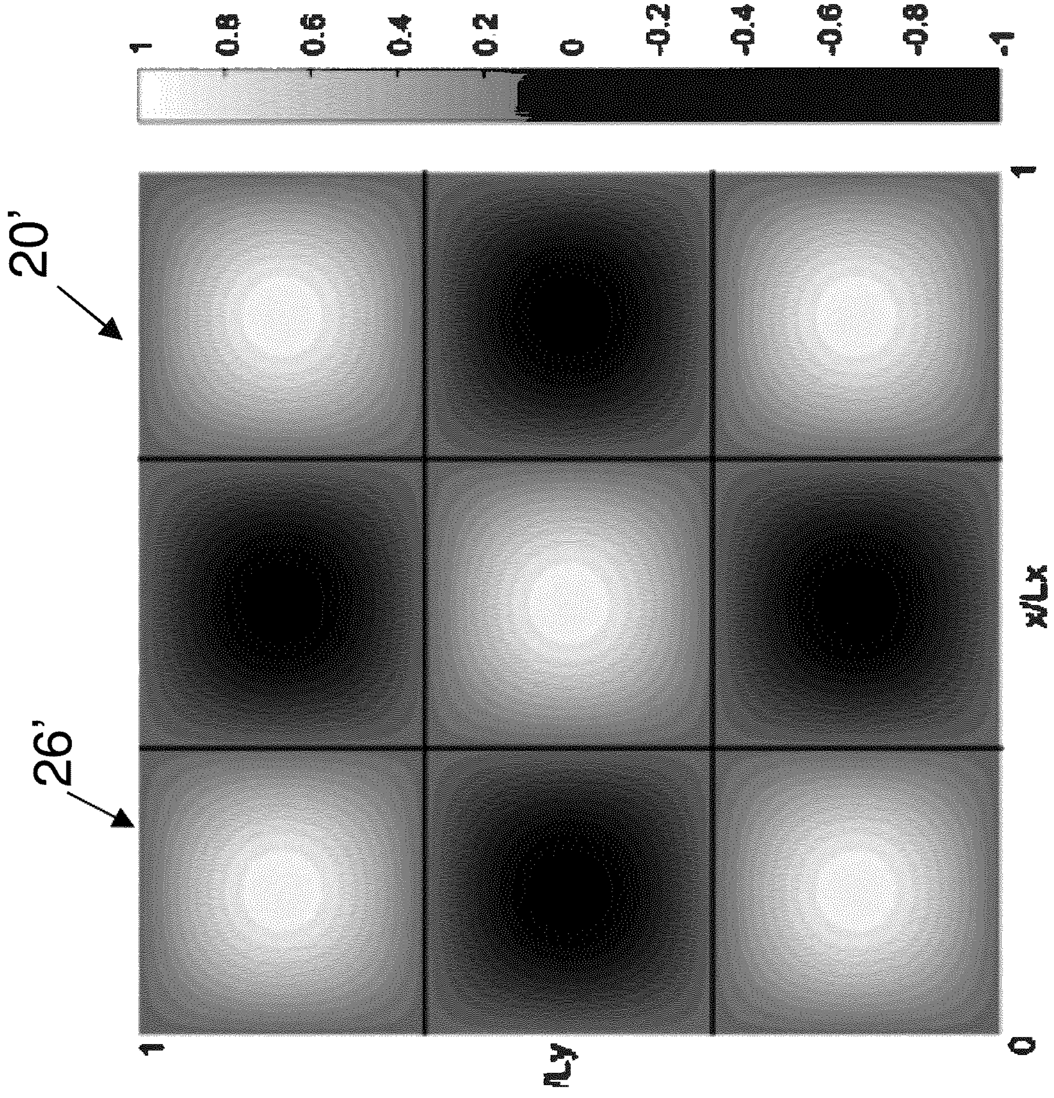

FIGS. 6*a* and 6*b* show plan views of a square membrane 20' simply supported about the periphery 26' of the membrane for different vibration modes. Each vibration mode will have its own corresponding modal frequency. Graduated contours are overlaid on the membrane 20' for each of FIGS. 6*a* and 6*b*, illustrating the displacement response of different parts of the membrane to the particular vibration mode.

FIG. 6*a* shows the displacement of the simply supported square membrane 20' for vibration mode (1,2). For mode (1, 2), the number 1 indicates that the fundamental vibration mode in the y-direction is activated in the membrane 20', whereas the number 2 indicates that the second harmonic vibration mode in the x-direction is activated. The displacement response of the membrane 20' for this vibration mode has a single antinode region in the y-direction, as well as two antinode regions in the x-direction.

FIG. 6*b* shows the displacement of the simply supported rectangular membrane 20' for vibration mode (3,3). For mode (3,3), the number 3 indicates that the second harmonic vibration mode in both the x and y-directions is activated in the membrane 20'. The displacement response of the membrane 20' for this vibration mode has three antinode regions in each of the x and y-directions.

If the actuator 40 was to be configured to excite any of the vibration modes shown for the circular clamped membrane 20 of FIGS. 5*a* to 5*c* or the square simply-supported membrane 20' of FIGS. 6*a* and 6*b*, the displacement response contour plots provide an indication of where the peak displacement magnitude (i.e. crest or trough) is likely to occur in the membrane. Such plots can assist in preferentially locating the plurality of nozzles 22 in the membrane 20 such that they are proximate to those regions of the membrane experiencing highest displacement magnitudes (i.e. the antinodes). As previously stated, such preferential locating of the nozzles in the vicinity of the antinodes assists in maximising the energy and velocity imparted to aerosol droplets during use of the aerosol-generating device 107.

In an alternative embodiment of the aerosol-generating device, the actuator 40 is configured to excite the membrane 20 of the aerosol-generating device 107 at two discrete predetermined modal frequencies. Each discrete modal frequency is associated with a corresponding vibration mode. By way of illustration, FIG. 7 illustrates the vibration response of a clamped circular membrane 20 with increasing radial distance, r, from the centre 27 of the membrane for two different vibration modes of the membrane. The two vibration modes are modes (0,3) and (4,1)—represented by the solid and dashed lines respectively of FIG. 7. For mode (0,3), the number 0 indicates that no circumferential vibration mode is activated in the membrane 20, whereas the number 3 indicates that the third harmonic vibration mode in the radial direction (relative to the centre 27 of the membrane) is activated. For mode (4,1), the number 4 indicates that the fourth harmonic circumferential vibration mode is activated in the membrane 20, whereas the number 1 indicates that the fundamental vibration mode in the radial direction (relative to the centre 27 of the membrane) is activated. For this alternative embodiment, the plurality of nozzles 22 are located in two discrete regions 231, 241 of the aerosol-generation zone 21. The first of these regions 231 defines a circle located at the centre of the membrane 20, whereas the second of these regions 241 is in the form of an annular band. The first region 231 is a first intersection region, in which antinodes corresponding to the vibration mode (0,3) are located proximate to nodes corresponding to the vibration mode (4,1). The second region 241 is a second intersection region, in which antinodes corresponding to the vibration mode (4,1) are located proximate to nodes corresponding to the vibration mode (0,3). When the actuator 40 excites mode (0,3) and liquid aerosol-forming substrate is fed to the membrane 20, aerosol droplets are ejected predominantly from the nozzles 22 of the first intersection region 231. However, once the actuator 40 switches to exciting mode (4,1), aerosol droplets instead emanate predominantly from the nozzles 22 of the second intersection region 241.

Figure 8B:
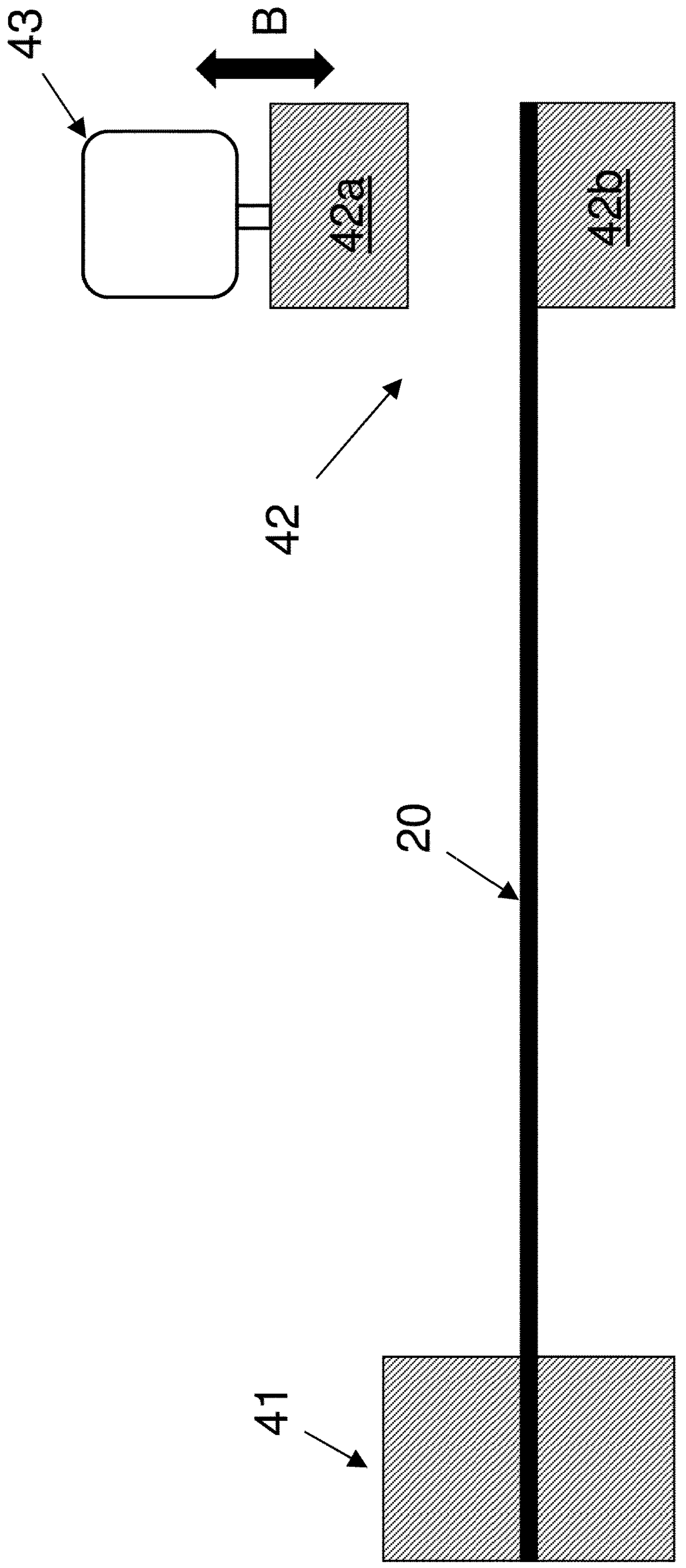

FIGS. 8*a* and 8*b* show a schematic view of an embodiment in which the aerosol-generating device 107 is configured to selectively apply and release a constraint to the membrane 20. For convenience, the location of the plurality of nozzles 22 in the membrane 20 for this embodiment are not shown in FIG. 8*a* or 8*b*. As shown in FIG. 8*a*, both two opposing edges of the membrane 20 are clamped. A clamp 41 is provide on the left-hand edge of the membrane 20. The clamp 41 is fixed, by which is meant that the clamp 41 continues to clamp the left-hand edge of the membrane 20 during operation of the actuator 40 of the aerosol-generating device 107. A releasable clamp 42 is provided on the right-hand edge of the membrane 20. The releasable clamp 42 is coupled to an electromechanical switch 43. As shown in FIGS. 8*a* and 8*b* (see arrow B), the electromechanical switch 43 is operable to move an upper half 42*a* of the releasable clamp 42 relative to a lower half 42*b* of the clamp, to selectively apply and release the upper half 42*a* from the membrane 20 and thereby apply and release the clamping of the right-hand edge of the membrane. Releasing and re-applying the clamping to an edge of the membrane 20 when the membrane is excited by the actuator 40 at a given predetermined modal frequency of the membrane has the effect of changing the displacement response of the membrane for that modal frequency. The change in displacement response of the membrane 20 in response to the change in constraint applied to the membrane can be exploited, by having the plurality of nozzles 22 preferentially located proximate to antinodes corresponding to the displacement of the membrane 20 for each of the differing constraint states of the membrane. FIGS. 9 and 10 illustrate two different embodiments of the aerosol-generating device 107, in which there is a progressive change in the thickness of the membrane 20 when traversing from a central region of the membrane towards the periphery of the membrane. The nozzles 22 are represented schematically in both FIGS. 9 and 10, with the actuator 40 coupled to the upper and lower surfaces of the membrane in the region of the membrane's periphery. FIG. 9 shows an example in which the membrane 20 progressively reduces in thickness when moving from the centre of the membrane towards the periphery of the membrane. FIG. 10 shows the converse situation in which the membrane 20 progressively increases in thickness when moving from the centre of the membrane towards the periphery of the membrane. The thickness of the membrane 20 is shown at a radial location r, relative to the centre of the membrane, with the thickness represented by symbol tr.

Liquid aerosol-forming substrate may be fed to the membrane 20 of the aerosol-generating device 107 in various ways. FIGS. 11, 12 and 13 illustrate examples of a liquid feed assembly 106, 106', 106" for supplying one or more liquid aerosol-forming substrates to a membrane 20 of an aerosol-generating device 107. For convenience, the actuator 40 is not shown in any of FIGS. 11 to 13.

FIG. 11 illustrates a liquid feed assembly 106 operable to supply a liquid aerosol-forming substrate to the membrane 20. The liquid feed assembly 106 has a moveable stage 1061. Flexible tubing 1062 extends between a reservoir of liquid aerosol-forming substrate (not shown) and a feed nozzle 1063. Arrow L shows the passage of liquid aerosol-forming substrate from the reservoir through the flexible tubing 1062. Although not shown in FIG. 11, an electric motor is coupled to the movable stage 1061. Operation of the motor causes the movable stage 1061 to traverse along the aerosol-generation zone 21 of the membrane 20 along a path P. During excitation of the membrane 20 by the actuator 40, the moveable stage 1061 traverses over the membrane to supply liquid aerosol-forming substrate through the feed nozzle 1063 proximate to antinodes and nozzles 22 corresponding to the predetermined modal frequency. The liquid feed assembly 106 shown in FIG. 11 may be applied to any shape of membrane 20.

FIG. 12 illustrates an alternative liquid feed assembly 106'. The liquid feed assembly 106' is shown in conjunction with a circular membrane 20. The liquid feed assembly 106' has three concentrically arranged tubes 1064, 1065, 1066. The radially-innermost tube 1064 defines a first concentric liquid aerosol-forming substrate feed channel for feeding a first liquid aerosol-forming substrate to the membrane 20. An annular gap between the radially-innermost tube 1064 and the middle tube 1065 defines a second concentric liquid aerosol-forming substrate feed channel for feeding a second liquid aerosol-forming substrate to the membrane 20. An annular gap between the middle tube 1065 and the radially-outermost tube 1066 defines a third concentric liquid aerosol-forming substrate feed channel for feeding a third liquid aerosol-forming substrate to the membrane 20. Each of the concentrically-arranged feed channels are fed or filled with a respective liquid aerosol-forming substrate from a reservoir (not shown). The concentrically-arranged first, second and third liquid aerosol-forming substrate feed channels supply their respective liquid aerosol-forming substrates to corresponding annular regions of the membrane 20. In an alternative embodiment (not shown), a wicking material may be located in each of the concentrically-arranged first, second and third liquid aerosol-forming substrate feed channels, with the wicking material for each concentric feed channel wetted with a respective liquid aerosol-forming substrate for that channel. In a further alternative embodiment, the liquid feed assembly 106' may also be used in conjunction with an elliptical membrane.

FIG. 13 illustrates a further alternative liquid feed assembly 106". The liquid feed assembly 106" is shown in conjunction with a square membrane 20'. The liquid feed assembly 106" has three linear channels 1067, 1068, 1069 defined in a substrate 1070. Each of the linear channels 1067, 1068, 1069 is fed with a respective liquid aerosol-forming substrate from a reservoir (not shown) by means of a respective liquid aerosol-forming substrate inlet 1071, 1072, 1073. The linear channels 1067, 1068, 1069 feed their respective liquid aerosol-forming substrates to corresponding linear regions of the membrane 20'. In an alternative embodiment (not shown), a wicking material is located in each of the linear channels 1067, 1068, 1069, with the wicking material for each channel wetted with a respective liquid aerosol-forming substrate for that channel.

Although not shown in FIGS. 11-13, the liquid feed assemblies 106, 106', 106" include one or more micropumps to actively feed the liquid aerosol-forming substrates to the membrane 20, 20'. The micropump(s) of the liquid feed assemblies 106, 106', 106" would be coupled to and powered by a power source (for example, the power source 103 shown in FIG. 1—see dashed line connecting to liquid feed assembly 106 in FIG. 1).

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number "A" is understood as "A"±10% of "A". Within this context, a number "A" may be considered to include numerical values that are within general standard error for the measurement of the property that the number "A" modifies. The number "A", in some instances as used in the appended claims, may deviate by the percentages enumerated above provided that the amount by which "A" deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating device, comprising:

a membrane having an aerosol-generation zone, in which the aerosol-generation zone comprises a plurality of nozzles, the plurality of nozzles being the only nozzles in the aerosol-generation zone; and an actuator coupled to the membrane, wherein the actuator is configured to excite the membrane to induce a vibration of the membrane at one or more predetermined modal frequencies of the membrane such that a liquid aerosol-forming substrate passing through the plurality of nozzles is aerosolised, wherein more than 50% of the plurality of nozzles are located closer to antinodes than to nodes of the membrane, where the antinodes and the nodes correspond to the membrane being excited at the one or more predetermined modal frequencies of the membrane, wherein the membrane continuously and progressively changes in thickness in a step-free manner from a centre of the membrane to a peripheral edge of the membrane, and wherein the aerosol-generating device is configured to selectively apply and release a constraint to the membrane so as to adjust a response of the membrane to the one or more predetermined modal frequencies.

2. The aerosol-generating device according to claim 1, wherein the plurality of nozzles are non-homogenously distributed over the aerosol-generation zone.

3. The aerosol-generating device according to claim 1, wherein at least 60% of the plurality of nozzles are located within a region extending either side of the antinodes, the region being where a magnitude of displacement of the membrane is at least 60% of a magnitude of displacement of the membrane at the antinodes for the corresponding one or more predetermined modal frequencies.

4. The aerosol-generating device according to claim 3, wherein all of the plurality of nozzles are located within the region extending either side of the antinodes.

5. The aerosol-generating device according to claim 1, wherein the one or more predetermined modal frequencies comprise a first predetermined modal frequency of the membrane and a second predetermined modal frequency of the membrane, and wherein the plurality of nozzles are preferentially located in a first and a second intersection region of the aerosol-generation zone, in which:

for the first intersection region, antinodes corresponding to the first predetermined modal frequency of the membrane are proximate to nodes corresponding to the second predetermined modal frequency of the membrane, and for the second intersection region, antinodes corresponding to the second predetermined modal frequency of the membrane are proximate to nodes corresponding to the first predetermined modal frequency of the membrane.

6. The aerosol-generating device according to claim 5, wherein all of the plurality of nozzles are located in the first and the second intersection regions.

7. The aerosol-generating device according to claim 5, wherein:

for the first intersection region, the nodes corresponding to the second predetermined modal frequency are located within a first zone extending either side of the antinodes corresponding to the first predetermined modal frequency, the first zone being where a magnitude of displacement of the membrane is at least 60% of a magnitude of displacement of the membrane at the antinodes for the first predetermined modal frequency, and for the second intersection region, the nodes corresponding to the first predetermined modal frequency are located within a second zone extending either side of the antinodes corresponding to the second predetermined modal frequency, the second zone being where the magnitude of displacement of the membrane is at least 60% of the magnitude of displacement of the membrane at the antinodes for the second predetermined modal frequency.

8. The aerosol-generating device according to claim 1, wherein the aerosol-generating device is configured to selectively apply and release the constraint along one or more portions of the periphery of the membrane.

9. The aerosol-generating device according to claim 1, wherein the actuator is further configured to selectively excite different parts of the membrane.

10. The aerosol-generating device according to claim 9, wherein the actuator comprises a plurality of actuator segments, each actuator segment coupled to a different part of the membrane.

11. The aerosol-generating device according to claim 1, wherein the actuator is further configured to apply a modulated driving signal to the membrane in order to excite the membrane.

12. The aerosol-generating device according to claim 1, wherein the membrane progressively reduces in thickness from a centre of the membrane to a peripheral edge of the membrane.

13. The aerosol-generating device according to claim 1, wherein the membrane progressively increases in thickness from a centre of the membrane to a peripheral edge of the membrane.

14. An aerosol-delivery system, comprising:

the aerosol-generating device according to claim 1; and a liquid feed configured to supply a liquid aerosol-forming substrate to the membrane.

15. The aerosol-generating device according to claim 1, wherein the one or more predetermined modal frequencies of the membrane are in a frequency range of 50 KHz to 300 KHz.

* * * * *